(12) United States Patent
Mizuno et al.

(10) Patent No.: US 6,272,099 B1
(45) Date of Patent: Aug. 7, 2001

(54) OBJECTIVE LENS WITH CENTER AND PERIPHERY PORTIONS PRODUCING RECIPROCAL INTERFERENCE, AND OPTICAL HEAD AND OPTICAL DISK DEVICE USING THE SAME

(75) Inventors: Sadao Mizuno, Ibaraki; Yoshiaki Komma, Kyoto, both of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/550,648

(22) Filed: Apr. 14, 2000

Related U.S. Application Data

(62) Division of application No. 08/972,913, filed on Nov. 18, 1997, now Pat. No. 6,069,860.

(30) Foreign Application Priority Data

Nov. 20, 1996 (JP) ..................................... 8-308957

(51) Int. Cl.[7] ....................................................... G11B 7/00
(52) U.S. Cl. ...................................... 369/112.26; 369/118
(58) Field of Search ..................................... 369/103, 109, 369/110, 112, 118, 121, 110.01, 110.02, 112.01, 112.16, 112.23, 112.25, 112.26

(56) References Cited

U.S. PATENT DOCUMENTS

| 5,097,464 | 3/1992 | Nishiuchi et al. . |
| 5,281,797 | 1/1994 | Tatsuno et al. . |
| 5,659,533 | 8/1997 | Chen et al. . |
| 5,665,957 | 9/1997 | Lee et al. . |
| 5,699,341 | 12/1997 | Sugi et al. . |
| 5,734,637 | 3/1998 | Ootaki et al. . |
| 5,745,466 | 4/1998 | Kasahara . |
| 5,761,176 | 6/1998 | Takahashi . |

FOREIGN PATENT DOCUMENTS

| 196 54 673 | 12/1996 | (DE) . |
| 0610055 | 8/1994 | (EP) . |
| 0731458 | 9/1995 | (EP) . |
| 0742554 | 11/1996 | (EP) . |
| 06215406 | 8/1994 | (JP) . |
| 06259804 | 9/1994 | (JP) . |
| 0319833 | 11/1986 | (TW) . |

OTHER PUBLICATIONS

Taiwan Office Action, with English translation, dated Jul. 25, 1989.
European Search Report for Application No. 97120197.5–2210–; Dated Apr. 6, 1998.

Primary Examiner—Paul W. Huber
(74) Attorney, Agent, or Firm—Renner, Otto, Boiselle & Sklar

(57) ABSTRACT

The objective lens of the present invention includes a center portion and a periphery portion surrounding the center portion. An aberration of the periphery portion is corrected such that a light spot is formed by the convergence of a luminous flux which has been transmitted through the periphery portion and then transmitted through a first light transmissive flat plate, and an aberration of the center portion is corrected such that a light spot is formed by the convergence of a luminous flux which has been transmitted through the center portion and then transmitted through a second light transmissive flat plate which is thicker than the first light transmissive flat plate.

14 Claims, 14 Drawing Sheets

Synthesize light spots passed through A1 and A2 ↓

Separate light spot passed through A2

OBJECTIVE LENS WITH CENTER AND PERIPHERY PORTIONS PRODUCING RECIPROCAL INTERFERENCE, AND OPTICAL HEAD AND OPTICAL DISK DEVICE USING THE SAME

This is a division of application Ser. No. 08/972,913, filed Nov. 18, 1997, now U.S. Pat. No. 6,069,860.

BACKGROUND OF THE INVENTION

1. Field of the Invention

The present invention relates to an objective lens for converging the light emitted from a light source onto the information recording surface of an optical disk, and also relates to an optical head and an optical disk device for optically recording/reproducing information onto/from an optical disk using the objective lens.

2. Description of the Related Art

An objective lens used for an optical head is designed in view of the predetermined base material thickness of an optical disk. Thus, when an optical disk having a different base material thickness from the predetermined thickness is installed, a spherical aberration is caused, so that the convergence performance is deteriorated and it becomes difficult to precisely record/reproduce information onto/from the optical disk. All of conventional optical disks, including a so-called "compact disk (CD)", i.e., a read-only disk for music replay, a video disk and a magneto-optical disk for data storage, have a uniform base material thickness of about 1.2 mm. Therefore, it has heretofore been possible to record/reproduce information from optical disks of various types by using a single optical head.

On the other hand, a digital video disk (DVD), the specifications of which have recently been unified, uses an objective lens having an increased numerical aperture (NA) in order to realize a high density. If the numerical aperture is increased, then the optical resolution of an optical disk is improved. As a result, the width of a frequency band on which the recording/reproducing operations are enabled can be expanded. However, if an optical disk to be installed has a tilt, then a coma is adversely increased. In general, an optical disk is tilted to a certain degree against an objective lens, because the optical disk itself has a certain deflection and some inclination is almost always involved when the optical disk is installed into an optical disk device. Consequently, a kind of aberration called "coma" is generated in a converged light spot. The coma disadvantageously prevents the convergence performance from being improved even when the numerical aperture is increased.

Thus, the base material thickness of a DVD (it is noted that the "base material thickness" of a DVD corresponds to the thickness of one of a pair of bonded substrates, unlike the cases of conventional optical disks) is reduced to about 0.6 mm such that the coma is not increased even when the numerical aperture of an objective lens is increased. However, reducing the base material thickness of an optical disk means changing the predetermined base material thickness for an objective lens for recording/reproducing information onto/from the optical disk. As a result, the objective lens for the changed base material thickness can no longer be used for recording/reproducing information onto/from conventional optical disks (i.e., CDs, magneto-optical disks for data storage, etc.), i.e., the objective lens is no longer compatible with the conventional optical disks.

In order to solve such a problem, a device using two optical heads such as that shown in FIG. 12 is proposed. The device shown in FIG. 12 includes two optical heads 70 and 83. The optical head 70 is used for recording/reproducing information onto/from an optical disk 10 having a base material thickness of about 0.6 mm, while the optical head 83 is used for recording/reproducing information onto/from an optical disk 11 having a base material thickness of about 1.2 mm. It is noted that, in FIG. 12, the left half portion of the optical disk 10 having the base material thickness of about 0.6 mm and the right half portion of the optical disk 11 having the base material thickness of about 1.2 mm are selectively illustrated.

In the optical head 70, the radiated light having a wavelength of about 650 nm which has been emitted from a semiconductor laser device 71 is condensed by a condenser lens 72 to be transformed into a luminous flux 73 of substantially parallel light beams. The luminous flux 73 is p-polarized light, which is incident onto and transmitted through a polarization beam splitter 74 and transformed by a quarter-wave plate 75 into substantially circularly polarized light. The circularly polarized light is reflected by a reflective mirror 76 to be incident onto an objective lens 77. The luminous flux 73 transmitted through the objective lens 77 is converged onto the information recording surface of the optical disk 10 having the base material thickness of about 0.6 mm, thereby forming a light spot 78 thereon.

The luminous flux reflected by the optical disk 10 passes through the objective lens 77, the reflective mirror 76 and the quarter-wave plate 75 again to be incident onto the polarization beam splitter 74. Since the reflected luminous flux is transformed by the quarter-wave plate 75 into s-polarized light, the s-polarized light is reflected by the polarization beam splitter 74, passed through a converging lens 79 and a cylindrical lens 80, and is received by a photodetector 81. The photodetector 81 photoelectrically converts the received reflected luminous flux to form a reproduced signal, forms a focusing control signal in accordance with an astigmatism method, forms a tracking control signal in accordance with a phase difference method and a push-pull method, and then outputs these signals.

An objective lens driver 82 drives the objective lens 77 in the focusing direction and the tracking direction, thereby making the light spot 78 follow the tracks on the surface of the recording medium onto/from which the information is recorded/reproduced.

On the other hand, in the optical head 83, the radiated light having a wavelength of about 780 nm which has been emitted from a semiconductor laser device 84 is condensed by a condenser lens 85 to be transformed into a luminous flux 86 of substantially parallel light beams. The luminous flux 86 is p-polarized light, which is incident onto and transmitted through a polarization beam splitter 87 and transformed by a quarter-wave plate 88 into substantially circularly polarized light. The circularly polarized light is reflected by a reflective mirror 89 to be incident onto an objective lens 90. The luminous flux 86 transmitted through the objective lens 90 is converged onto the information recording surface of the optical disk 11 having the base material thickness of about 1.2 mm, thereby forming a light spot 91 thereon.

The luminous flux reflected by the optical disk 11 passes through the objective lens 90, the reflective mirror 89 and the quarter-wave plate 88 again to be incident onto the polarization beam splitter 87. Since the reflected luminous flux is transformed by the quarter-wave plate 88 into s-polarized light, the s-polarized light is reflected by the polarization beam splitter 87, passed through a converging lens 92 and a cylindrical lens 93, and received by a photodetector 94. The photodetector 94 photoelectrically converts the received reflected luminous flux to form a reproduced signal, forms a focusing control signal in accordance with an astigmatism method, forms a tracking control signal in accordance with a phase difference method and a push-pull method, and then outputs these signals.

An objective lens driver 95 drives the objective lens 90 in the focusing direction and the tracking direction, thereby making the light spot 91 follow the tracks on the surface of the recording medium onto/from which the information is recorded/reproduced.

In the above-described arrangement, in the case of recording/reproducing information onto/from the optical disk 11 having a base material thickness of about 1.2 mm such as a CD, the optical head 83 is operated and controlled such that the light spot 91 is formed on the information recording surface of the optical disk 11. On the other hand, in the case of recording/reproducing information onto/from the optical disk 10 having a base material thickness of about 0.6 mm such as a DVD, the optical head 70 is operated and controlled such that the light spot 78 is formed on the information recording surface of the optical disk 10. In this way, information can be recorded/reproduced onto/from both the optical disks 10 and 11 having different base material thicknesses.

However, in the above-described conventional arrangement, since two optical heads are used, two optical systems including optical members, photodetectors, objective lens drivers, focusing drivers and tracking drivers are required, so that the necessary costs are doubled.

Furthermore, though a distance S between the light spots 78 and 91 is constant, the angle θ formed between the line linking the light spots 78 and 91 and an information track 95 on the inner periphery of the optical disk is different from the angle θ formed between the line linking the light spots 78 and 91 and an information track 95 on the outer periphery of the optical disk. When the angles θ are variable, the diffraction patterns of the information tracks 95 which are included in the reflected luminous flux rotate, thereby varying the levels of the tracking signals and deteriorating the quality of the tracking signals.

Moreover, when an optical disk is installed within a cartridge, the two objective lens drivers 82 and 95 are required to be disposed within an opening 96 of the cartridge. Thus, since the objective lens drivers 82 and 95 must be downsized, the forces of the objective lens drivers 82 and 95 for driving the objective lenses 77 and 90 are decreased, and it becomes difficult to reproduce information from an optical disk by increasing the rotations per minute of the optical disk.

SUMMARY OF THE INVENTION

The objective lens of the present invention includes a center portion and a periphery portion surrounding the center portion. An aberration of the periphery portion is corrected such that a light spot is formed by the convergence of a luminous flux which has been transmitted through the periphery portion and then transmitted through a first light transmissive flat plate, and an aberration of the center portion is corrected such that a light spot is formed by the convergence of a luminous flux which has been transmitted through the center portion and then transmitted through a second light transmissive flat plate which is thicker than the first light transmissive flat plate.

The optical head of the present invention includes: a light source for emitting a luminous flux; an objective lens for converging the luminous flux onto either the information recording surface of a first light transmissive flat plate functioning as a recording medium or the information recording surface of a second light transmissive flat plate also functioning as a recording medium; and a photodetector for detecting the luminous flux, which has been reflected by or transmitted through the information recording surface of the first or the second light transmissive flat plate, thereby outputting an electric signal. The objective lens includes a center portion and a periphery portion surrounding the center portion. An aberration of the periphery portion is corrected such that a light spot is formed by the convergence of the luminous flux which has been transmitted through the periphery portion and then transmitted through the first light transmissive flat plate, and an aberration of the center portion is corrected such that a light spot is formed by the convergence of the luminous flux which has been transmitted through the center portion and then transmitted through the second light transmissive flat plate which is thicker than the first light transmissive flat plate.

In one embodiment, the first and the second light transmissive flat plates have a thickness t1 and a thickness t2, respectively, the aberration of the periphery portion is corrected such that a light spot is formed by the convergence of the luminous flux which has been transmitted through the periphery portion of the objective lens and then transmitted through the first light transmissive flat plate having the thickness t1, and the aberration of the center portion is corrected such that a light spot is formed by the convergence of the luminous flux which has been transmitted through the center portion of the objective lens and then transmitted through a light transmissive flat plate having a thickness in the range from about (t2×0.7) to t2.

In another embodiment, the thickness t2 of the second light transmissive flat plate is set at a thickness approximately twice as large as the thickness t1 of the first light transmissive flat plate.

In still another embodiment, the optical head further include aperture control means for limiting the aperture of the objective lens. The aperture of the objective lens is limited by the aperture control means when the luminous flux emitted from the light source is converged onto the information recording surface of the second light transmissive flat plate.

In still another embodiment, the optical head further includes separation means for separating the luminous flux, which has been reflected by or transmitted through either the information recording surface of the first light transmissive flat plate or the information recording surface of the second light transmissive flat plate, into a first luminous flux which has been transmitted through the periphery portion of the objective lens and a second luminous flux which has been transmitted through the center portion of the objective lens. The photodetector detects the first and the second luminous fluxes, thereby outputting respective electric signals. The electric signals of the photodetector respectively corresponding to the first and the second luminous fluxes are selected when the luminous flux emitted from the light source is converged onto the information recording surface of the first light transmissive flat plate, and the electric signal of the photodetector corresponding to the second luminous flux is selected when the luminous flux emitted from the light source is converged onto the information recording surface of the second light transmissive flat plate.

In still another embodiment, the separation means is a polarizing hologram.

In still another embodiment, assuming the wavelength of the luminous flux emitted from the light source is denoted by λ nm, the numerical aperture of the center portion of the objective lens is set to be substantially equal to or smaller than (λ/780)×0.53.

In still another embodiment, assuming the wavelength of the luminous flux emitted from the light source is in the range from about 600 nm to about 700 nm, the numerical aperture of the center portion of the objective lens is set in the range from about 0.34 to about 0.4 and the numerical aperture of the periphery portion of the objective lens is set to be substantially equal to about 0.6.

The optical head according to another aspect of the present invention includes: a first light source for emitting a first luminous flux; a second light source for emitting a second luminous flux having a wavelength different from a wavelength of the first luminous flux emitted by the first light source; an objective lens for converging the first luminous flux onto the information recording surface of a first light transmissive flat plate functioning as a recording medium and for converging the second luminous flux onto the information recording surface of a second light transmissive flat plate also functioning as a recording medium; and a photodetector for detecting the luminous flux, which has been reflected by or transmitted through the information recording surface of the first or the second light transmissive flat plate, thereby outputting an electric signal. The objective lens includes a center portion and a periphery portion surrounding the center portion. An aberration of the periphery portion is corrected such that a light spot is formed by the convergence of the first luminous flux which has been transmitted through the periphery portion and then transmitted through the first light transmissive flat plate, and an aberration of the center portion is corrected such that a light spot is formed by the convergence of the second luminous flux which has been transmitted through the center portion and then transmitted through the second light transmissive flat plate which is thicker than the first light transmissive flat plate.

In one embodiment, assuming the thickness t1 of the first light transmissive flat plate to be about 0.6 mm and the thickness t2 of the second light transmissive flat plate to be about 1.2 mm, the aberration of the periphery portion is corrected such that a light spot is formed by the convergence of the first luminous flux which has been transmitted through the periphery portion of the objective lens and then transmitted through the first light transmissive flat plate having the thickness of about 0.6 mm, and the aberration of the center portion is corrected such that a light spot is formed by the convergence of the second luminous flux which has been transmitted through the center portion of the objective lens and then transmitted through a light transmissive flat plate having a thickness in the range from about 0.84 mm to about 1.2 mm.

In another embodiment, the optical head further includes aperture control means for limiting the aperture of the objective lens. The aperture of the objective lens is limited by the aperture control means when the second luminous flux emitted from the second light source is converged onto the information recording surface of the second light transmissive flat plate.

In still another embodiment, the aperture control means is a wavelength filter for transmitting the second luminous flux emitted from the second light source and blocking the first luminous flux emitted from the first light source.

In still another embodiment, the optical head further includes separation means for separating the luminous flux, which has been reflected by or transmitted through either the information recording surface of the first light transmissive flat plate or the information recording surface of the second light transmissive flat plate, into the first luminous flux which has been transmitted through at least the periphery portion of the objective lens and the second luminous flux which has been transmitted through the center portion of the objective lens. The photodetector detects the first and the second luminous fluxes, thereby outputting respective electric signals. The electric signal of the photodetector corresponding to the first luminous flux is selected when the first luminous flux is converged onto the information recording surface of the first light transmissive flat plate, and the electric signal of the photodetector corresponding to the second luminous flux is selected when the second luminous flux is converged onto the information recording surface of the second light transmissive flat plate.

In still another embodiment, the separation means is a polarizing hologram.

In still another embodiment, assuming the wavelength of the first luminous flux emitted from the first light source is in the range from about 600 nm to about 700 nm and the wavelength of the second luminous flux emitted from the second light source is in the range from about 750 nm to about 860 nm, the numerical aperture of the center portion of the objective lens is set to be substantially equal to about 0.45 and the numerical aperture of the periphery portion of the objective lens is set to be substantially equal to about 0.6.

The optical head according to still another aspect of the present invention includes: a light source for emitting a luminous flux; an objective lens for converging the luminous flux onto either the information recording surface of a first light transmissive flat plate functioning as a recording medium or the information recording surface of a second light transmissive flat plate also functioning as a recording medium; separation means for separating the luminous flux, which has been reflected by or transmitted through either the information recording surface of the first light transmissive flat plate or the information recording surface of the second light transmissive flat plate, into a first luminous flux which has been transmitted through the periphery portion of the objective lens and a second luminous flux which has been transmitted through the center portion of the objective lens; and a photodetector for detecting the first and the second luminous fluxes, thereby outputting respective electric signals.

The optical disk device of the present invention, including an optical head, records/reproduces information onto/from the information recording surfaces of a first and a second optical disks which have respectively different thicknesses and are used as the first and the second light transmissive flat plates of the optical head. The optical head includes a light source for emitting a luminous flux; an objective lens for converging the luminous flux onto either the information recording surface of a first light transmissive flat plate functioning as a recording medium or the information recording surface of a second light transmissive flat plate also functioning as a recording medium; and a photodetector for detecting the luminous flux, which has been reflected by or transmitted through the information recording surface of the first or the second light transmissive flat plate, thereby outputting an electric signal, the objective lens including a center portion and a periphery portion surrounding the center portion, an aberration of the periphery portion bring corrected such that a light spot is formed by the convergence of the luminous flux which has been transmitted through the periphery portion and then transmitted through the first light transmissive flat plate, and an aberration of the center portion being corrected such that a light spot is formed by the convergence of the luminous flux which has been transmitted through the center portion and then transmitted through the second light transmissive flat plate which is thicker than the first light transmissive flat plate. The objective lens of the optical head converges the luminous flux onto the information recording surfaces of the first and the second optical disks. The photodetector of the optical head detects the luminous flux, which has been reflected by or transmitted through the information recording surface of the first or the second disk, thereby outputting an electric signal.

The optical disk device according another aspect of the present invention, including an optical head, records/reproduces information onto/from the information recording surfaces of a first and a second optical disks which have respectively different thicknesses and are used as the first and the second light transmissive flat plates of the optical head. The optical head includes a first light source for emitting a first luminous flux; a second light source for emitting a second luminous flux having a wavelength different from a wavelength of the first luminous flux emitted by the first light source; an objective lens for converging the first luminous flux onto the information recording surface of a first light transmissive flat plate functioning as a recording medium and for converging the second luminous flux onto the information recording surface of a second light transmissive flat plate also functioning as a recording medium; and a photodetector for detecting the luminous flux, which has been reflected by or transmitted through the information recording surface of the first or the second light transmissive flat plate, thereby outputting an electric signal, the objective lens including a center portion and a periphery portion surrounding the center portion, an aberration of the periphery portion being corrected such that a light spot is formed by the convergence of the first luminous flux which has been transmitted through the periphery portion and then transmitted through the first light transmissive flat plate, and an aberration of the center portion being corrected such that a light spot is formed by the convergence of the second luminous flux which has been transmitted through the center portion and then transmitted through the second light transmissive flat plate which is thicker than the first light transmissive flat plate. The objective lens of the optical head converges the luminous flux onto the information recording surfaces of the first and the second optical disks. The photodetector of the optical head detects the luminous flux, which has been reflected by or transmitted through the information recording surface of the first or the second disk, thereby outputting an electric signal.

The optical disk device according still another aspect of the present invention, records/reproduces information onto/from the information recording surfaces of a first and a second optical disks which have respectively different thicknesses and are used as the first and the second light transmissive flat plates of the optical head. The optical head includes: a light source for emitting a luminous flux; an objective lens for converging the luminous flux onto either the information recording surface of a first light transmissive flat plate functioning as a recording medium or the information recording surface of a second light transmissive flat plate also functioning as a recording medium; separation means for separating the luminous flux, which has been reflected by or transmitted through either the information recording surface of the first light transmissive flat plate or the information recording surface of the second light transmissive flat plate, into a first luminous flux which has been transmitted through the periphery portion of the objective lens and a second luminous flux which has been transmitted through the center portion of the objective lens; and a photodetector for detecting the first and the second luminous fluxes, thereby outputting respective electric signals. The objective lens of the optical head converges the luminous flux onto the information recording surfaces of the first and the second optical disks. The photodetector of the optical head detects the luminous flux, which has been reflected by or transmitted through the information recording surface of the first or the second disk, thereby outputting an electric signal.

Thus, the invention described herein makes possible the advantages of (1) providing an objective lens enabling a single optical head to record/reproduce information onto/from optical disks having different thicknesses, (2) providing an optical head using the objective lens, and (3) providing an optical disk device including the optical head.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
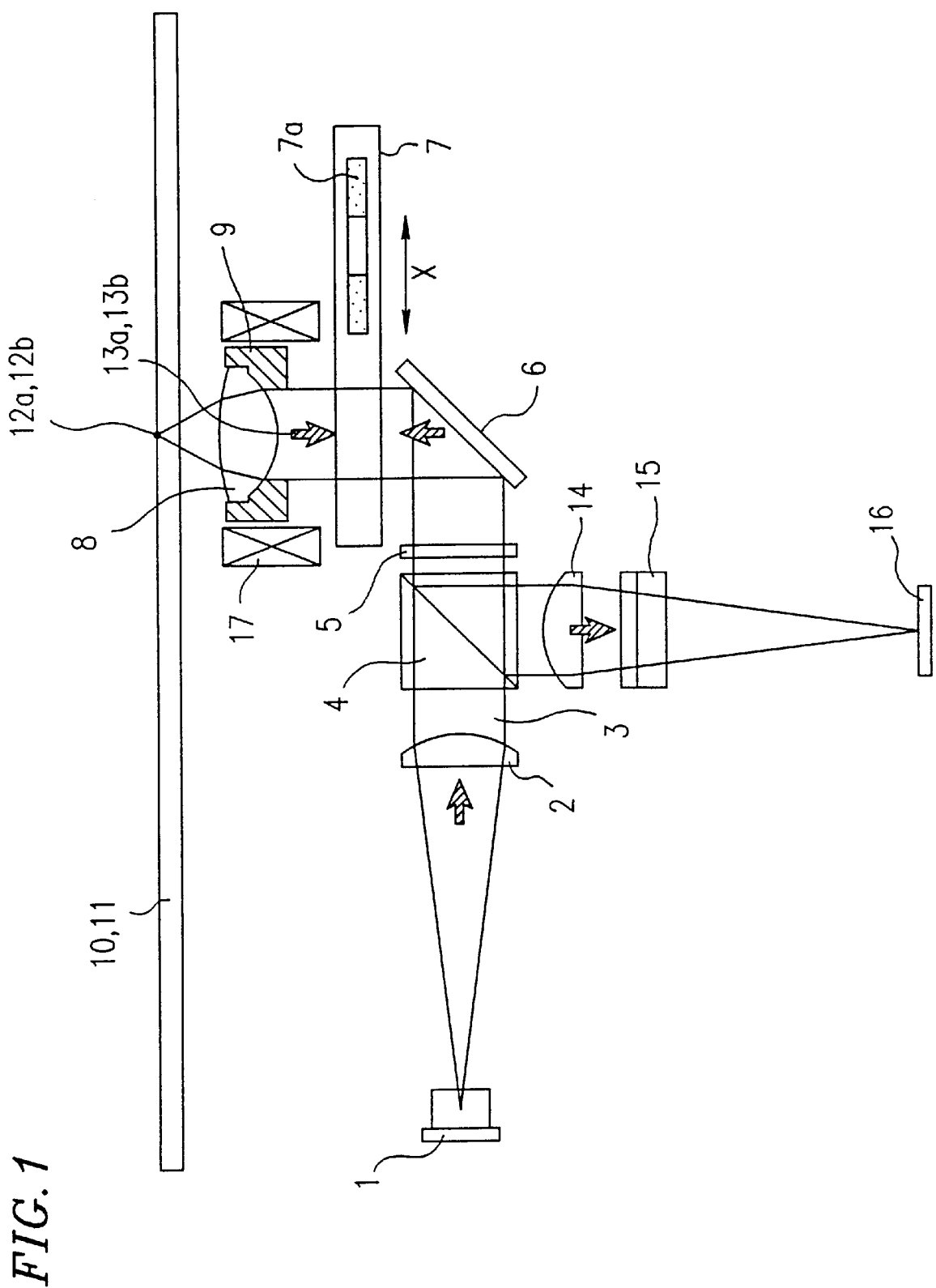
FIG. 1 is a block diagram showing the first example of the optical head of the present invention.

FIG. 1 illustrates the first example of the optical head of the present invention.

In FIG. 1, the radiated light having a wavelength of about 650 nm which has been emitted from a semiconductor laser device 1 is condensed by a condenser lens 2 to be transformed into a luminous flux 3 of substantially parallel light beams. The luminous flux 3 is p-polarized light, which is incident onto and transmitted through a polarization beam splitter 4.

The luminous flux 3 which has been transmitted through the polarization beam splitter 4 is transformed by a quarter-wave plate 5 from linearly polarized light into substantially circularly polarized light, reflected by a reflective mirror 6, passed through an aperture control section 7 and then incident onto an objective lens 8.

Figure 2A:
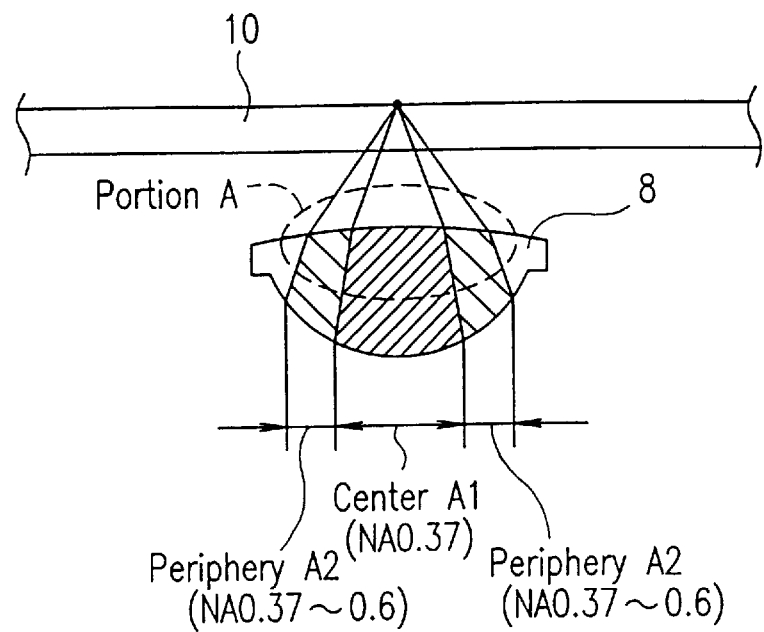
FIG. 2A shows the cross section and the upper surface of an objective lens in the optical head shown in FIG. 1.
Figure 2A:
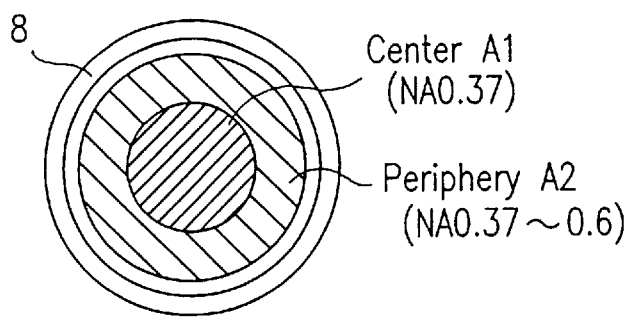

As shown in FIG. 2A, the objective lens 8 includes a center portion A1, and a periphery portion A2 surrounding the center portion A1. The numerical aperture (NA) of the center portion A1 is about 0.37 and the NA of the periphery portion A2 is about 0.6. The center portion A1 having the numerical aperture of about 0.37 is designed such that the aberration of a light spot to be transmitted through the center portion A1 and formed on the information recording surface of an optical disk becomes minimum when the base material thickness of the optical disk is about 0.9 mm. On the other hand, the periphery portion A2 having the numerical aperture of about 0.6 is designed such that the aberration of a light spot to be transmitted through the periphery portion A2 and formed on the information recording surface of an optical disk becomes minimum when the base material thickness of the optical disk is about 0.6 mm.

Figure 2B:
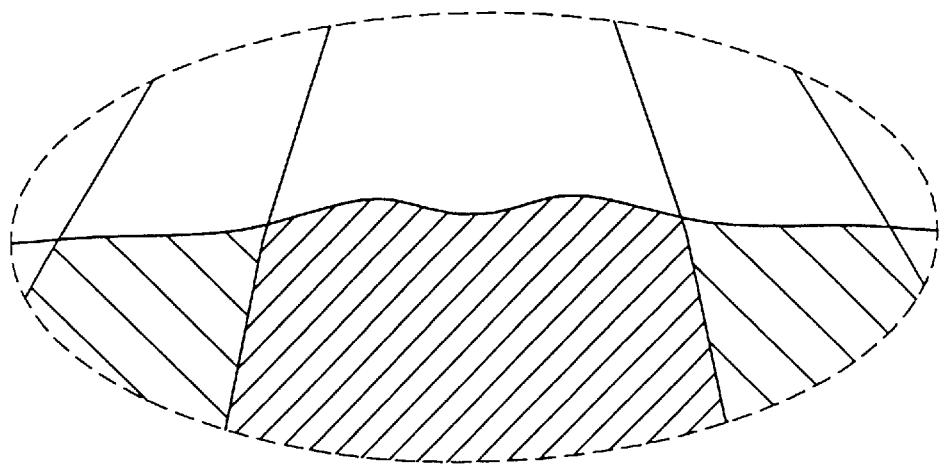
FIG. 2B is a partially enlarged cross-sectional view of the objective lens shown in FIG. 2A.

FIG. 2B illustrates the cross-sectional shape of the upper portion of the objective lens 8. By forming the center portion A1 in the shape shown in FIG. 2B, a light spot with a minimized aberration can be formed on the information recording surface of an optical disk having a base material thickness of about 0.9 mm. On the other hand, by forming the periphery portion A2 in the shape shown in FIG. 2B, a light spot with a minimized aberration can be formed on the information recording surface of an optical disk having a base material thickness of about 0.6 mm. The surface region including the periphery portion A2 and the center portion A1 has a smoothly varying aspheric shape.

The aperture control section 7 is provided with a shutter 7a which is movable in a direction indicated by the arrow X in FIG. 1. When the shutter 7a is moved to the left to be located on the optical path, the shutter 7a limits the aperture of the objective lens 8. On the other hand, when the shutter 7a is moved to the right to be out of the optical path, the shutter 7a does not limit the aperture of the objective lens 8.

Figure 3A:
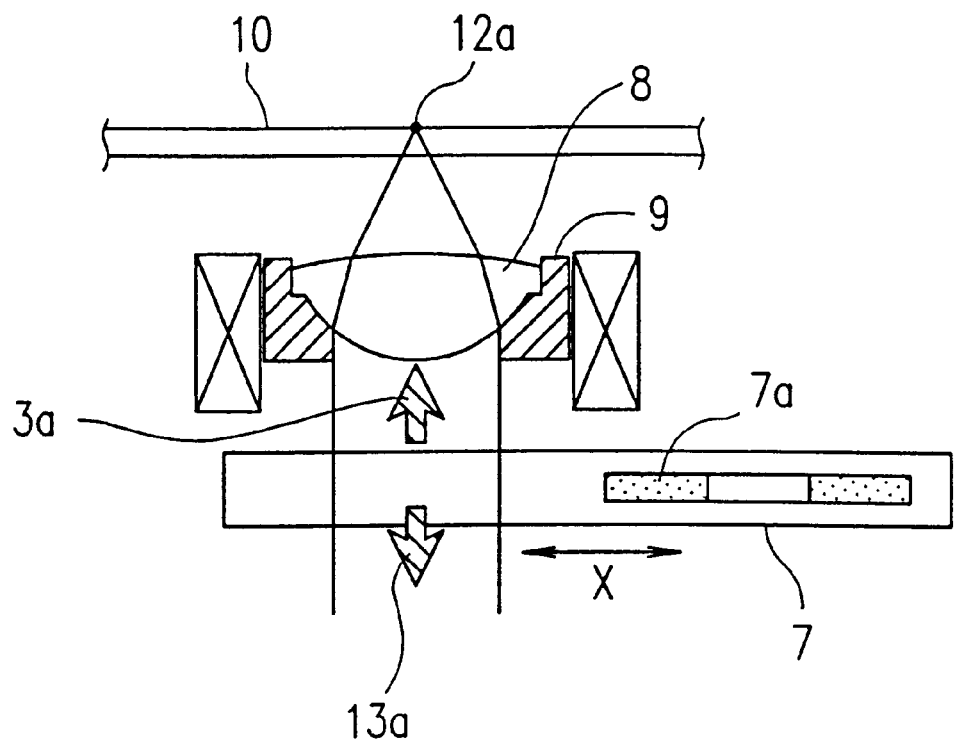
FIG. 3A is a view showing how information is recorded/reproduced by the optical head shown in FIG. 1 onto/from an optical disk having a base material thickness of about 0.6 mm.

FIG. 3A illustrates how information is recorded/reproduced onto/from the optical disk 10 having a base material thickness of about 0.6 mm. In this case, the shutter 7a is out of the optical path. Thus, the numerical aperture of the objective lens 8 is not limited by the shutter 7a but is limited to about 0.6 by the inner diameter of an objective lens holder 9. Consequently, the luminous flux 3a is transmitted through the center portion A1 and the periphery portion A2 of the objective lens 8 and converged by the objective lens 8 to form a light spot 12a on the information recording surface of the optical disk 10 having a base material thickness of about 0.6 mm.

Figure 3B:
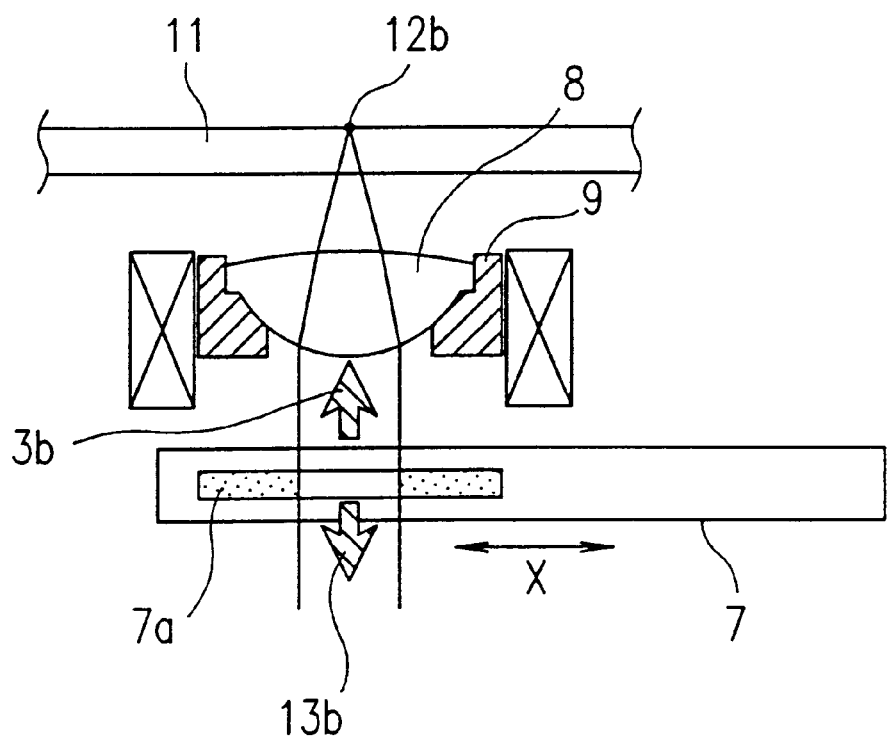
FIG. 3B is a view showing how information is recorded/reproduced by the optical head shown in FIG. 1 onto/from an optical disk having a base material thickness of about 1.2 mm.

FIG. 3B illustrates how information is recorded/reproduced onto/from the optical disk 11 having a base material thickness of about 1.2 mm, not from the optical disk 10. In this case, the shutter 7a is moved onto the optical path. Thus, the numerical aperture of the objective lens 8 is limited by the shutter 7a to about 0.37. Consequently, the luminous flux 3b is transmitted only through the center portion A1 of the objective lens 8 to form a light spot 12b on the information recording surface of the optical disk 11 having a base material thickness of about 1.2 mm.

The reflected luminous fluxes 13a and 13b which have been reflected by the optical disks 10 and 11, respectively, are condensed again by the objective lens 8, passed through the aperture control section 7, the reflective mirror 6 and the quarter-wave plate 5 and then incident onto the beam splitter 4.

Since the reflected luminous fluxes 13a and 13b are transformed by the quarter-wave plate 5 into s-polarized light, the reflected luminous fluxes 13a and 13b are reflected by the beam splitter 4, passed through the converging lens 14 and the cylindrical lens 15 and received by the photodetector 16.

The photodetector 16 photoelectrically converts the received luminous fluxes 13a and 13b to form reproduced signals, forms focusing control signals in accordance with an astigmatism method, forms tracking control signals in accordance with a phase difference method and a push-pull method, and then outputs these signals.

An objective lens driver 17 drives the objective lens 8 in the focusing direction and the tracking direction, thereby making the light spots 12a and 12b respectively follow the tracks on the surface of the optical disks 10 and 11 onto/from which the information is recorded/reproduced.

Next, the objective lens 8 will be described in more detail below.

As described above, the numerical aperture of the periphery portion A2 of the objective lens 8 is about 0.6. The periphery portion A2 is designed such that the aberration of the light spot 12a formed on the information recording surface of the optical disk 10 having a base material thickness of about 0.6 mm becomes minimum when the luminous flux 3a has been transmitted through the periphery portion A2 and converged on the information recording surface.

Figure 4A:
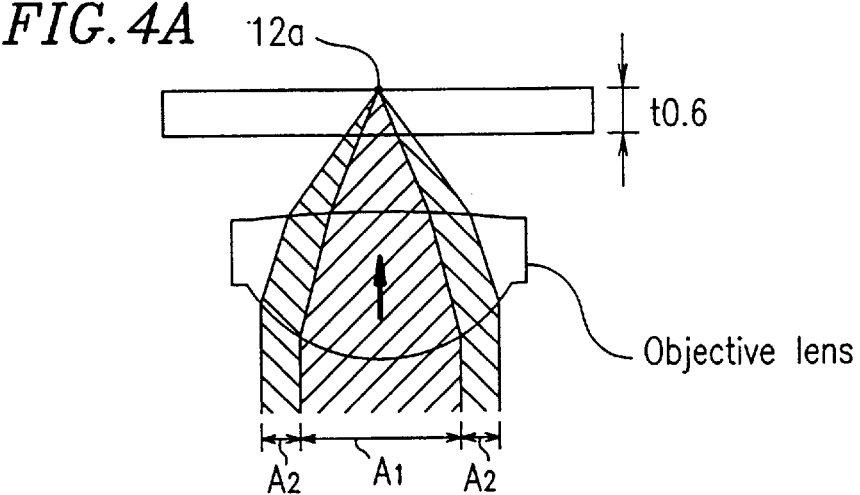
FIG. 4A illustrates the function of the objective lens in the state shown in FIG. 3A.
Figure 4A:
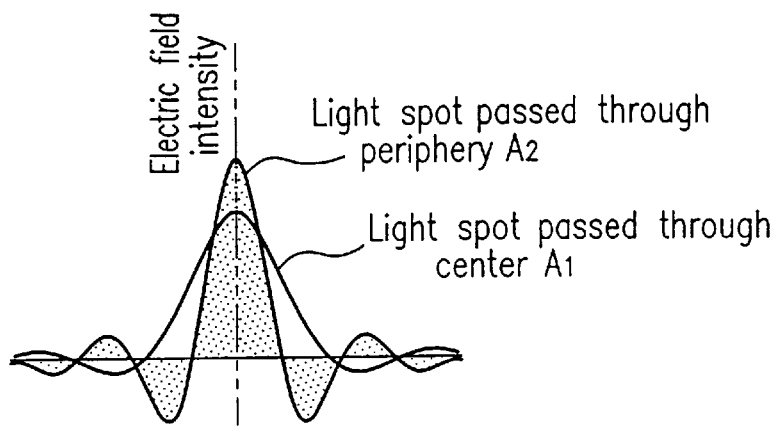
Figure 4A:
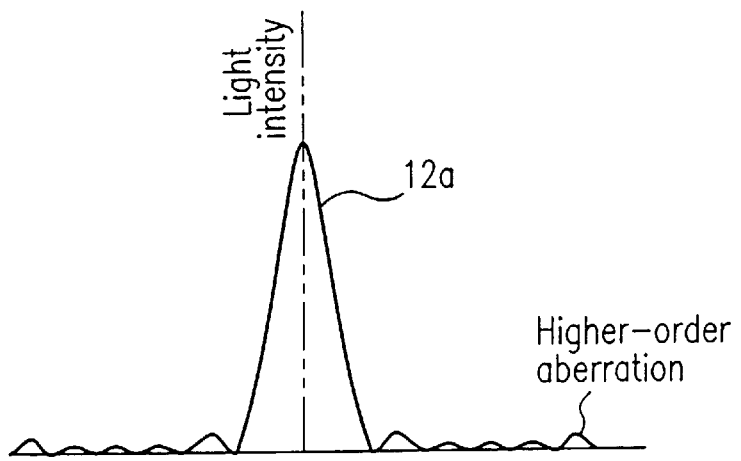

When the luminous flux 3a passes through the periphery portion A2, the luminous flux 3a also passes through the center portion A1 of the objective lens 8. Thus, as shown in FIG. 4A, the luminous fluxes which have respectively passed through the center portion A1 and the periphery portion A2 are converged onto the information recording surface of the optical disk 10 having a base material thickness of about 0.6 mm. The center portion A1 is designed such that the aberration of the light spot 12a becomes minimum when the base material thickness of an optical disk is about 0.9 mm, as described above. In addition, the center portion A1 and the periphery portion A2 are designed such that the first-order side lobe of the light spot 12a is minimized by the reciprocal interference of the respective luminous fluxes which have passed through the center portion A1 and the periphery portion A2 to reach the information recording surface of the optical disk 10 having a base material thickness of about 0.6 mm. As a result, the third-order spherical aberration caused by the light spot 12a converged by the center portion A1 and the periphery portion A2 can be suppressed to a similar level to that of a conventional lens which has been exclusively designed so as to form a light spot with a minimized aberration on the information recording surface of an optical disk having a base material thickness of about 0.6 mm.

When the third-order spherical aberration is suppressed in this way, a higher-order aberration is increased to the contrary. However, such a higher-order aberration appears as a higher-order side lobe of the light spot 12a. Since the higher-order side lobe is distributed over a wide range, the reflected light caused by the higher-order side lobe does not contain high-band signal components and the light amount thereof is averaged. Thus, even when such reflected light is received and photoelectrically converted by the photodetector 16, the signal components thereof do not constitute noise components of the reproduced signals, the focusing control signals and the tracking control signals, and therefore do not deteriorate these signals. Accordingly, even when the luminous flux 3a is passed through the center portion A1 and the periphery portion A2 so as to be converged, a sufficiently small light spot 12a can be formed, thereby precisely recording/reproducing information onto/from an optical disk having a base material thickness of about 0.6 mm such as a DVD.

On the other hand, as also described above, the aberration of the light spot formed on the information recording surface of an optical disk by making a luminous flux pass through the center portion A1 of the objective lens 8 becomes minimum when the base material thickness of the optical disk is about 0.9 mm. When the luminous flux 3b which has passed through the center portion A1 is converged on the information recording surface of the optical disk 11 having a base material thickness of about 1.2 mm, the aberration of the light spot 12b becomes approximately half of the aberration defined by Marshall's criteria. In other words, the size of the light spot 12b can be reduced to a practical size.

Figure 4B:
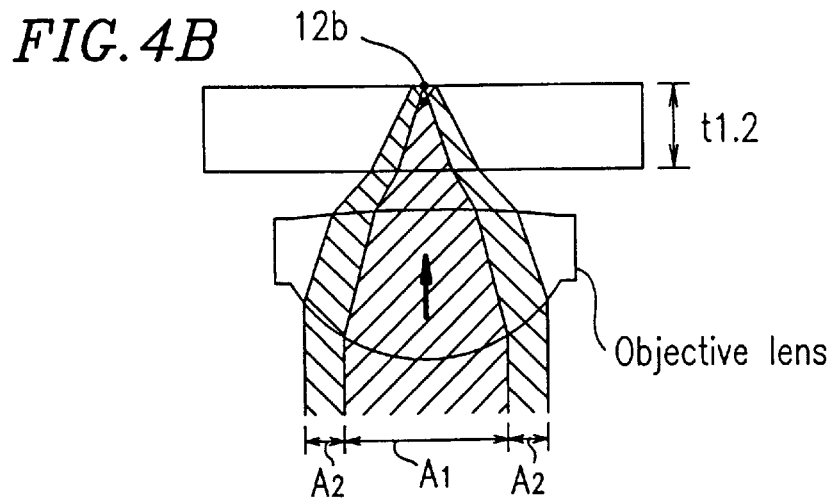
FIG. 4B illustrates the function of the objective lens in the state shown in FIG. 3B.
Figure 4B:
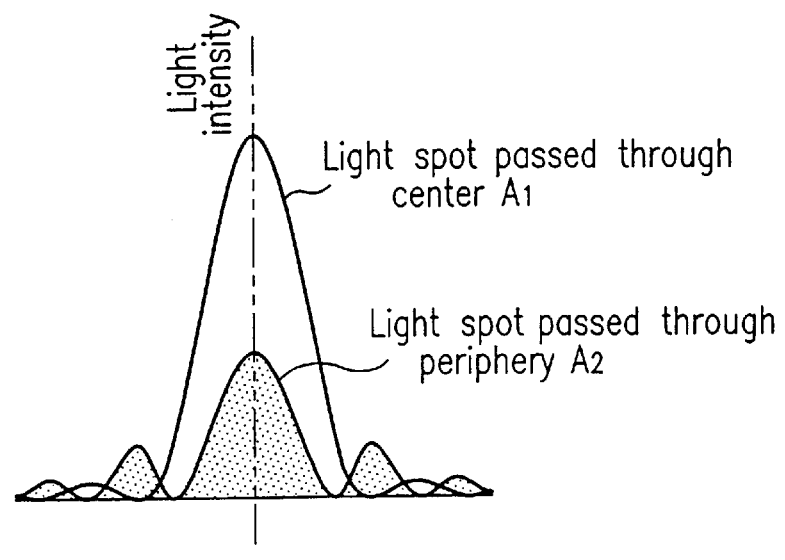
Figure 4B:
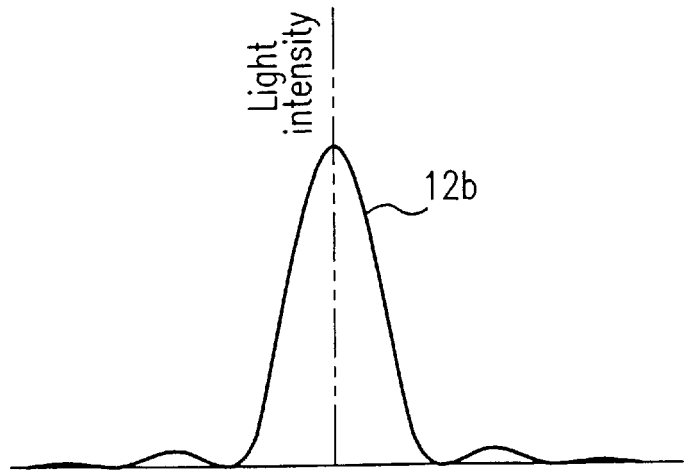

As is clear from FIG. 4B, when the luminous flux passed through the periphery portion A2 is converged on the information recording surface of the optical disk 11 having a base material thickness of about 1.2 mm, a blurred light spot is formed. On the other hand, when the luminous flux passed through the center portion A1 is converged on the information recording surface of the optical disk 11, a sufficiently small light spot 12b is formed. Thus, if the numerical aperture of the objective lens 8 is limited by the shutter 7a to about 0.37 and the luminous flux 3b is allowed to pass only through the center portion A1 so as to be converged, then a sufficiently small light spot 12b can be formed. Consequently, information can be precisely recorded/reproduced onto/from an optical disk having a base material thickness of about 1.2 mm such as a CD.

If a luminous flux is converged onto an optical disk having a base material thickness of about 1.2 mm such as a CD by using a conventional objective lens designed exclusively for an optical disk having a base material thickness of about 0.6 mm such as a DVD, then a large spherical aberration is caused so that the luminous flux is not converged into a point. Though the spherical aberration is relatively small in the paraxial rays located in the vicinity of the optical axis, a critical read error is likely to be caused when the base material thickness of the optical disk used is doubled. If an objective lens having a numerical aperture of about 0.6 which has been predetermined for an optical disk having a base material thickness of about 0.6 mm is used, the numerical aperture of the objective lens is limited to about 0.37 and a luminous flux is converged onto an optical disk having a base material thickness of about 1.2 mm, then a spherical aberration of about 60 m$\lambda$ is caused. If information is recorded/reproduced onto/from the optical disk in such a state, then the resulting jitter is increased by about 30% and the quality of the focusing signal is deteriorated. Though it is not impossible to reproduce information when the quality of the signal is deteriorated to such a degree, it is desirable to reduce the spherical aberration in view of the variations of the environment, fabrication error of the optical disks and the like.

If the base material thickness of an optical disk which can form a light spot with a minimized aberration through the center portion A1 of the objective lens 8 having a numerical aperture of about 0.37 (hereinafter, such a base material thickness will be referred to as an "optimum base material thickness") is set to be 70% of the base material thickness of about 1.2 mm of the optical disk (i.e., about 0.84 mm), then the spherical aberration can be reduced to about 40 m$\lambda$, and information can be reproduced with substantially no error. Alternatively, the optimum base material thickness of the center portion A1 having a numerical aperture of about 0.37 may be set in an approximate range from about 0.84 mm to about 1.2 mm.

In the first example, since the optimum base material thickness of the center portion A1 of the objective lens 8 having a numerical aperture of about 0.37 is set at about 0.9 mm which is greater than about 0.6 mm, information can be precisely recorded/reproduced onto/from an optical disk having a base material thickness of about 1.2 mm.

A wavefront aberration is increased in an optical disk having a base material thickness of about 0.6 mm such as a DVD. However, since almost all of the wavefront aberration is a higher-order aberration, a spherical aberration, which is a critical problem during reproduction, can be suppressed to a low level.

Thus, the objective lens of the present invention hardly deteriorates the performance of the optical head with respect to a DVD and can improve the reproduction performance of the optical head with respect to a CD.

In a conventional device for reproducing information from a CD, the wavelength of a luminous flux emitted from a semiconductor laser device is set in the range from about 780 nm to about 820 nm and the numerical aperture of an objective lens is set at about 0.45. On the other hand, in various information recording/reproducing devices for a video disk and the like, the numerical aperture of an objective lens is further increased to about 0.53.

In this first example, since the wavelength of the luminous flux emitted from the semiconductor laser device 1 is set at about 650 nm, the numerical aperture of the center portion A1 of the objective lens 8 is set in accordance with the wavelength of about 650 nm. If a device in which the base material thickness of an optical disk is set at about 1.2 mm, the wavelength of the luminous flux emitted from a semiconductor laser device is set at about 780 nm, and the numerical aperture of an objective lens is set at about 0.45 is assumed to be used, then the numerical aperture required for realizing a similar performance to that of such a device by setting the wavelength $\lambda$ at an appropriate value is obtained by ($\lambda$/780)×0.45. Since the wavelength of the luminous flux is about 650 nm in this case, the numerical aperture becomes (650/780)×0.45=0.375, which is approximately equal to the numerical aperture (=about 0.37) of the center portion A1 of the objective lens 8.

In a conventional device for reproducing information from a DVD, the wavelength of a luminous flux emitted from a semiconductor laser device is set in the range from about 635 nm to about 660 nm and the numerical aperture of the objective lens is set at about 0.6 in many cases. In addition, the wavelength of the luminous flux is possibly set in the range from about 600 nm to about 700 nm.

In the first example, the wavelength of a luminous flux emitted from the semiconductor laser device 1 is set at about 650 nm and the numerical aperture of the periphery portion A2 of the objective lens 8 is set at about 0.6. Thus, the optical disk device of this example can maintain a reproduction ability comparable to that of a conventional device.

EXAMPLE 2

Figure 5:
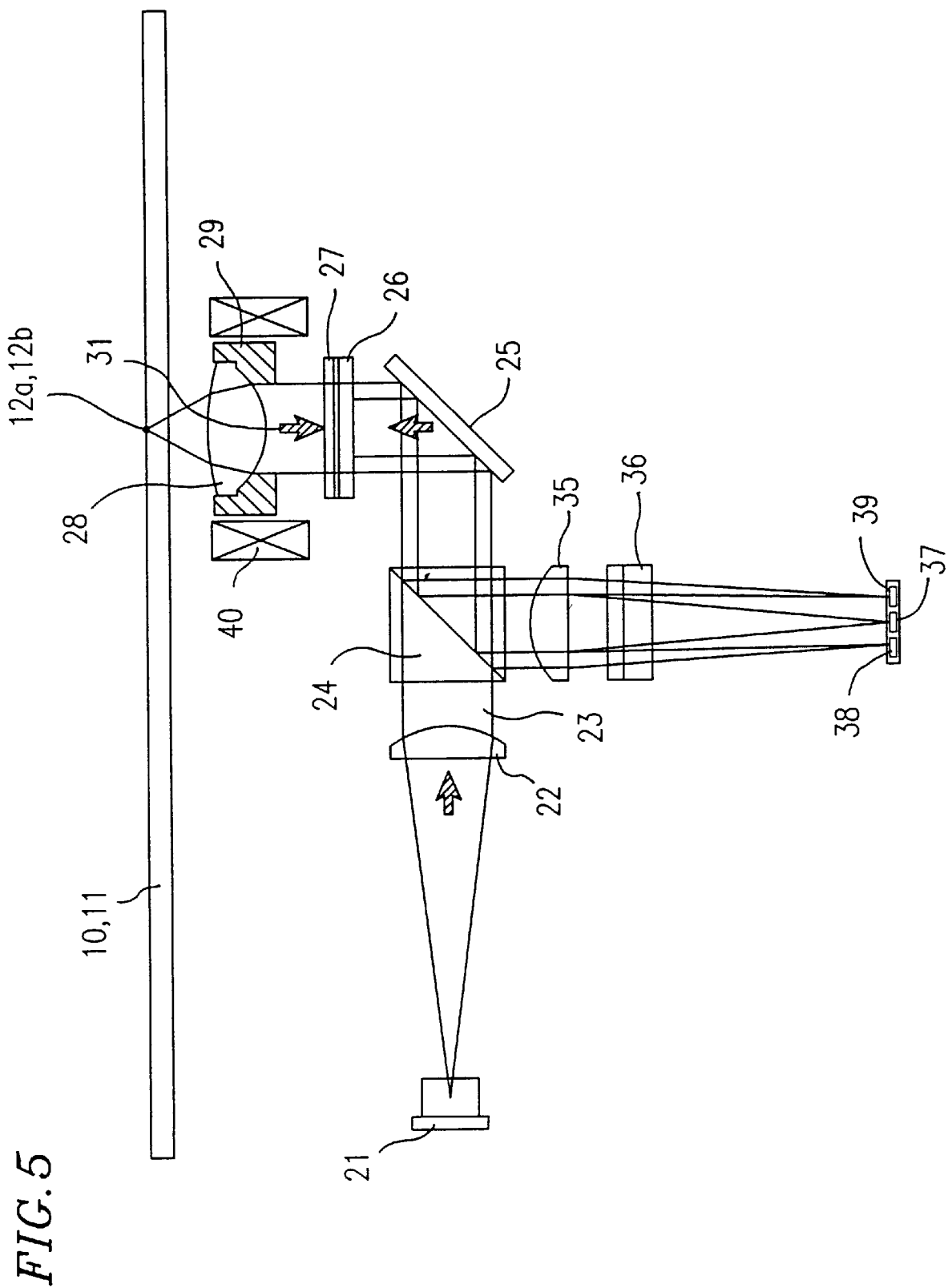
FIG. 5 is a block diagram showing the second example of the optical head of the present invention.

FIG. 5 illustrates the second example of the optical head of the present invention.

In FIG. 5, the radiated light having a wavelength of about 650 nm which has been emitted from a semiconductor laser device 21 is condensed by a condenser lens 22 to be transformed into a luminous flux 23 of substantially parallel light beams. The luminous flux 23 is p-polarized light, which is incident onto and transmitted through a polarization beam splitter 24. The luminous flux 23 which has been transmitted through the polarization beam splitter 24 is reflected by a reflective mirror 25 and is incident onto a polarizing hologram 26.

Figure 6:
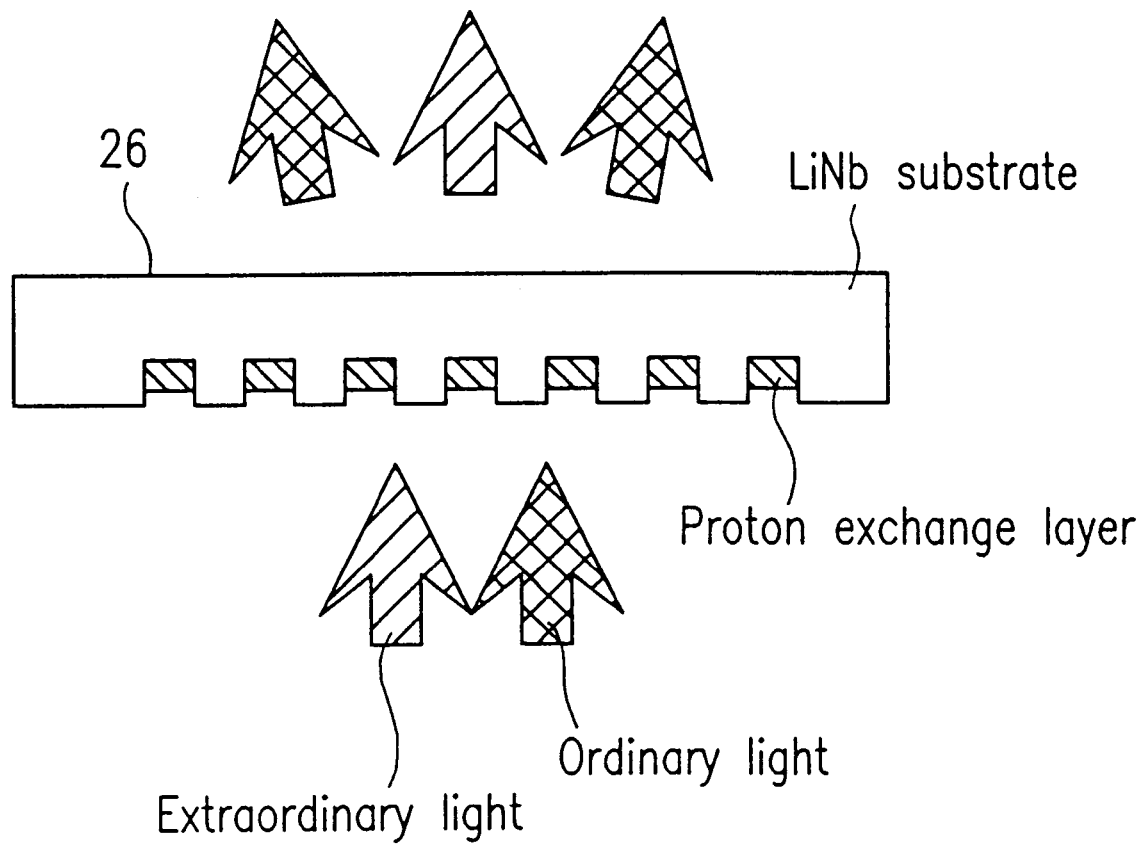
FIG. 6 is a cross-sectional view of a polarizing hologram in the optical head shown in FIG. 5.

As shown in FIG. 6, the polarizing hologram 26 is provided with a hologram on a LiNb substrate having birefringence properties and is configured so as to diffract ordinary light and to transmit extraordinary light. Alternatively, the hologram may be formed by subjecting the LiNb substrate to a proton exchange.

Almost all the components of the luminous flux 23 are those of extraordinary light, which is incident onto and transmitted through the polarizing hologram 26. A quarter-wave plate 27 is integrated with the polarizing hologram 26. The luminous flux 23 passes through the quarter-wave plate 27 for transforming linearly polarized light into circularly polarized light, and is incident onto an objective lens 28. An objective lens holder 29 limits the aperture of the objective lens 28 such that the numerical aperture thereof becomes about 0.6.

The objective lens 28 includes a center portion A1 and periphery portion A2 surrounding the center portion A1, in the same way as the objective lens 8 shown in FIG. 2A. The numerical aperture (NA) of the center portion A1 is about 0.37 and the NA of the periphery portion A2 is about 0.6. The center portion A1 having the numerical aperture of about 0.37 is designed such that the aberration of a light spot passed through the center portion A1 and formed on the information recording surface of an optical disk becomes minimum when the base material thickness of the optical disk is about 0.9 mm. On the other hand, the periphery portion A2 having the numerical aperture of about 0.6 is designed such that the aberration of a light spot passed through the periphery portion A2 and formed on the information recording surface of an optical disk becomes minimum when the base material thickness of the optical disk is about 0.6 mm.

The luminous flux 23 converged by the objective lens 28 forms a light spot 12a on the information recording surface of the optical disk 10 having a base material thickness of about 0.6 mm or forms a light spot 12b on the information recording surface of the optical disk 11 having a base material thickness of about 1.2 mm.

Figure 7:
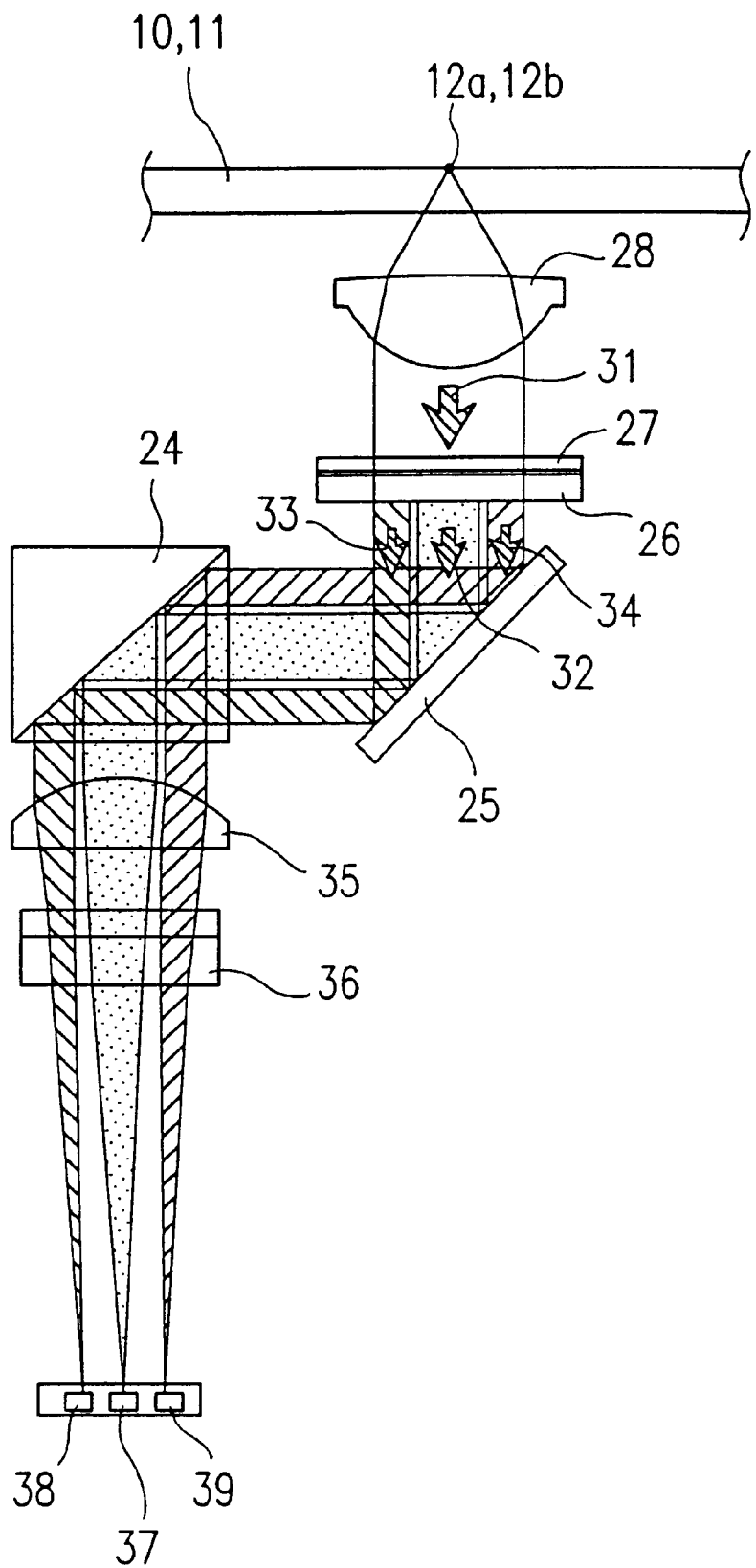
FIG. 7 is a partially enlarged view of the optical head shown in FIG. 5.

Next, the reflected luminous flux 31 reflected by the optical disk 10 or 11 is condensed again by the objective lens 28, transformed by the quarter-wave plate 27 from substantially circularly polarized light into linearly polarized light which is orthogonal to the luminous flux 23, and incident onto the polarizing hologram 26. Thus, the reflected light 31 is incident as ordinary light onto the polarizing hologram 26 and then diffracted by the polarizing hologram 26 to be divided into three reflected luminous fluxes 32, 33 and 34, as shown in FIG. 7.

The polarizing hologram 26 includes a center region and a periphery region corresponding to the center portion A1 and the periphery portion A2 of the objective lens 28, respectively, and the patterns of the hologram are designed so as to correspond to the respective regions. Consequently, the luminous flux which has passed through the center portion A1 having a numerical aperture of about 0.37 and then passed through the center region of the polarizing hologram 26 becomes the reflected luminous flux 32, and the luminous fluxes which have passed through the periphery portion A2 having a numerical aperture in the range from about 0.37 to about 0.6 and then passed through the periphery region of the polarizing hologram 26 become the reflected luminous fluxes 33 and 34.

The reflected luminous fluxes 32, 33 and 34 are reflected by the reflective mirror 25 and incident onto the polarization beam splitter 24. Since these reflected luminous fluxes 32, 33 and 34 are transformed by the quarter-wave plate 27 into s-polarized light and then incident onto the polarization beam splitter 24, these luminous fluxes are reflected by the polarization beam splitter 24, passed through a converging lens 35 and a cylindrical lens 36 and then received by photodetectors 37, 38 and 39, respectively.

The photodetector 37 receives the reflected luminous flux 32 to form a reproduced signal, forms a focusing control signal in accordance with an astigmatism method, forms a tracking control signal in accordance with a phase difference method and a push-pull method, and then outputs these signals. Similarly, the two other photodetectors 38 and 39 receive the luminous fluxes 33 and 34, respectively, and form and output the respective reproduced signals.

An objective lens driver 40 drives the objective lens 28 in the focusing direction and the tracking direction, thereby making the light spots 12a and 12b follow the tracks on the surface of the optical disks 10 and 11 onto/from which the information is recorded/reproduced.

Alternatively, the polarizing hologram 26 and the quarter-wave plate 27 may be integrated with the objective lens 28 and the assembly may be driven by the objective lens driver 40.

In the above-described arrangement, in order to set the numerical aperture of the objective lens 28 at about 0.6 so that information is reproduced from the optical disk 10 having a base material thickness of about 0.6 mm, it is necessary to select all the luminous fluxes which have been passed through the center portion A1 and the periphery portion A2 of the objective lens 28, i.e., all of the reflected luminous fluxes 32, 33 and 34. For such a purpose, a sum of the signals reproduced by the respective photodetectors 37, 38 and 39 is obtained, and the sum signal is used. In this case, information is reproduced from the optical disk 10 by using all the reflected luminous flux 31, i.e., all of the luminous fluxes 32, 33 and 34.

On the other hand, in order to set the numerical aperture of the objective lens 28 at about 0.37 so that information is reproduced from the optical disk 11 having a base material thickness of about 1.2 mm, it is necessary to select a part of the luminous flux 31 which have been passed through the center portion A1 of the objective lens 28, i.e., only the reflected luminous flux 32. For such a purpose, only the signal reproduced by the photodetector 37 is used.

In this way, the reflected luminous flux 32 which has passed through the center portion A1 having a numerical aperture of about 0.37 and the luminous fluxes 33 and 34 which have passed through the periphery portion A2 having a numerical aperture in the range from about 0.37 to about 0.6 are formed by making the polarizing hologram 26 separate the reflected luminous flux 31 reflected by the optical disk 10 or 11, instead of substantially limiting the aperture of the objective lens 28. These reflected luminous fluxes 32, 33 and 34 are individually detected by the photodetectors 37, 38 and 39, respectively, and then the reproduced signals of the photodetectors 37, 38 and 39 are selectively used. In such a case, since no mechanical drive system is required for limiting the aperture of the objective lens, a downsized and highly reliable optical head can be formed.

EXAMPLE 3

Figure 8:
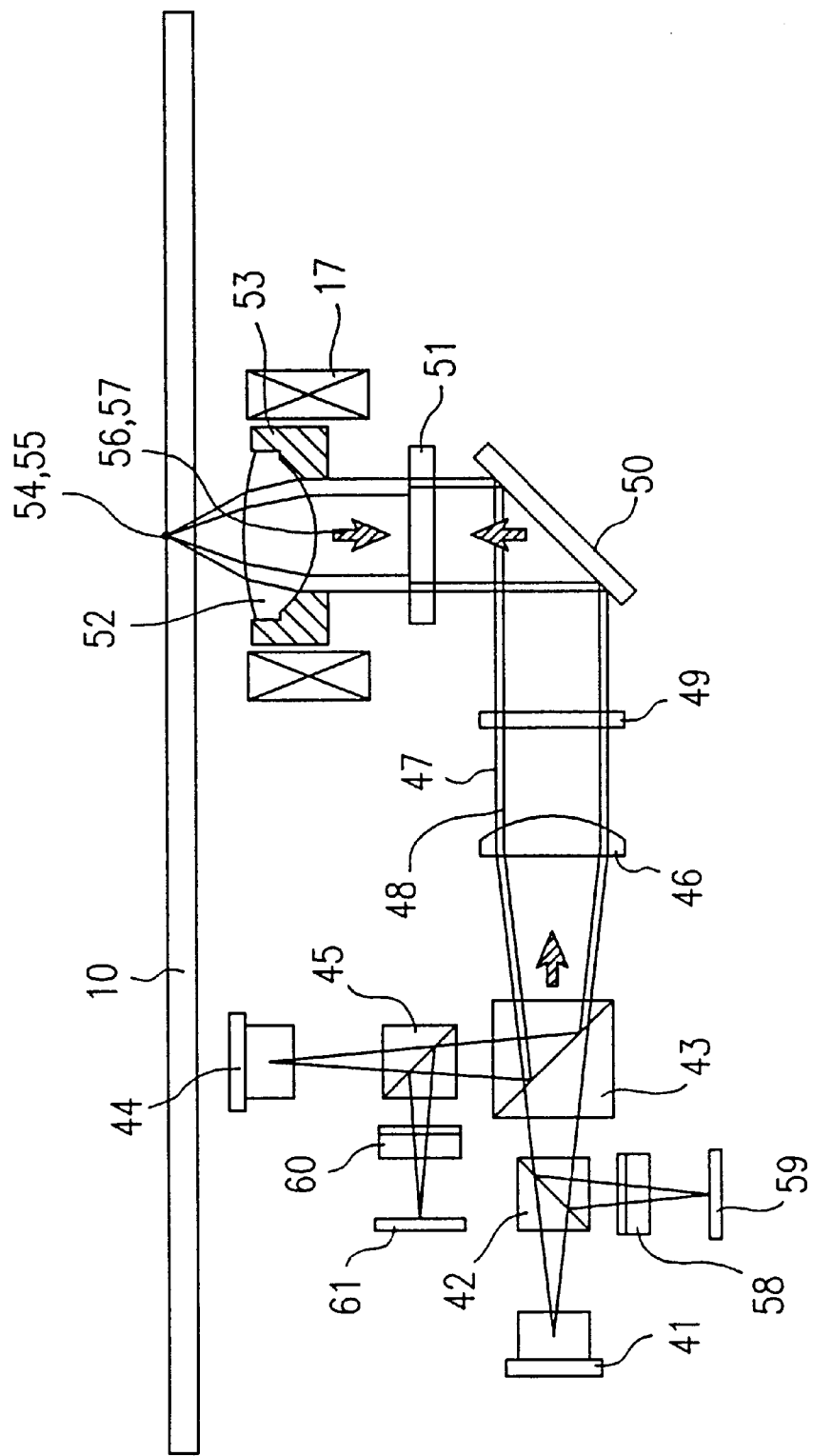
FIG. 8 is a block diagram showing the third example of the optical head of the present invention.

FIG. 8 illustrates the third example of the optical head of the present invention.

In FIG. 8, radiated light having a wavelength of about 650 nm which has been emitted from a first semiconductor laser device 41 is p-polarized light, which is transmitted through a first polarization beam splitter 42, and then incident onto an optical path synthesizer/separator 43. The optical path synthesizer/separator 43 is configured so as to transmit a luminous flux having a wavelength of about 650 nm and to reflect a luminous flux having a wavelength of about 780 nm. Thus, the radiated light having a wavelength of about 650 nm which has been emitted from the first semiconductor laser device 41 is transmitted through the optical path synthesizer/separator 43 and then condensed by a condenser lens 46 to be transformed into a luminous flux 47 of substantially parallel light beams.

The luminous flux 47 passes through a quarter-wave plate 49 for transforming linearly polarized light into substantially circularly polarized light, a reflective mirror 50 and a wavelength filter 51 so as to be incident onto an objective lens 52.

The wavelength filter 51 is configured such that the region thereof corresponding to the center portion of the objective lens 52 having a numerical aperture of about 0.45 or less transmits light having a wavelength of about 650 nm and light having a wavelength of about 780 nm, and that the region thereof corresponding to the periphery portion of the objective lens 52 having a numerical aperture larger than about 0.45 transmits light having a wavelength of about 650 nm but reflects light having a wavelength of about 780 nm.

Thus, the luminous flux 47 having a wavelength of about 650 nm is transmitted through the wavelength filter 51. In this case, the numerical aperture of the objective lens 52 is limited by an objective lens holder 53 to about 0.6. The luminous flux 47 transmitted through the objective lens 52 with the numerical aperture limited to about 0.6 is converged by the objective lens 52 to form a light spot 54 on the information recording surface of the optical disk 10 having a base material thickness of about 0.6 mm.

On the other hand, radiated light having a wavelength of about 780 nm which has been emitted from a second semiconductor laser device 44 is also p-polarized light, which is transmitted through a second polarization beam splitter 45, and then incident onto the optical path synthesizer/separator 43. The optical path synthesizer/separator 43 is configured so as to reflect a luminous flux having a wavelength of about 780 nm. Thus, the radiated light having a wavelength of about 780 nm is reflected by the optical path synthesizer/separator 43 and then condensed by the condenser lens 46 to be transformed into a luminous flux 48 of substantially parallel light beams.

The luminous flux 48 passes through the quarter-wave plate 49 for transforming linearly polarized light into substantially circularly polarized light, the reflective mirror 50 and the wavelength filter 51 so as to be incident onto the objective lens 52. Since the luminous flux 48 has a wavelength of about 780 nm, the luminous flux 48 is reflected by the region of the wavelength filter 51 corresponding to the periphery portion of the objective lens 52 having a numerical aperture larger than about 0.45 and is transmitted by the region of the wavelength filter 51 corresponding to the center portion of the objective lens 52 having a numerical aperture of about 0.45 or less. As a result, the numerical aperture of the objective lens 45 is substantially limited to about 0.45. When the numerical aperture is limited to about 0.45, the luminous flux 48 is converged by the objective lens 52 to form a light spot 55 on the information recording surface of the optical disk 11 having a base material thickness of about 1.2 mm.

Figure 9:
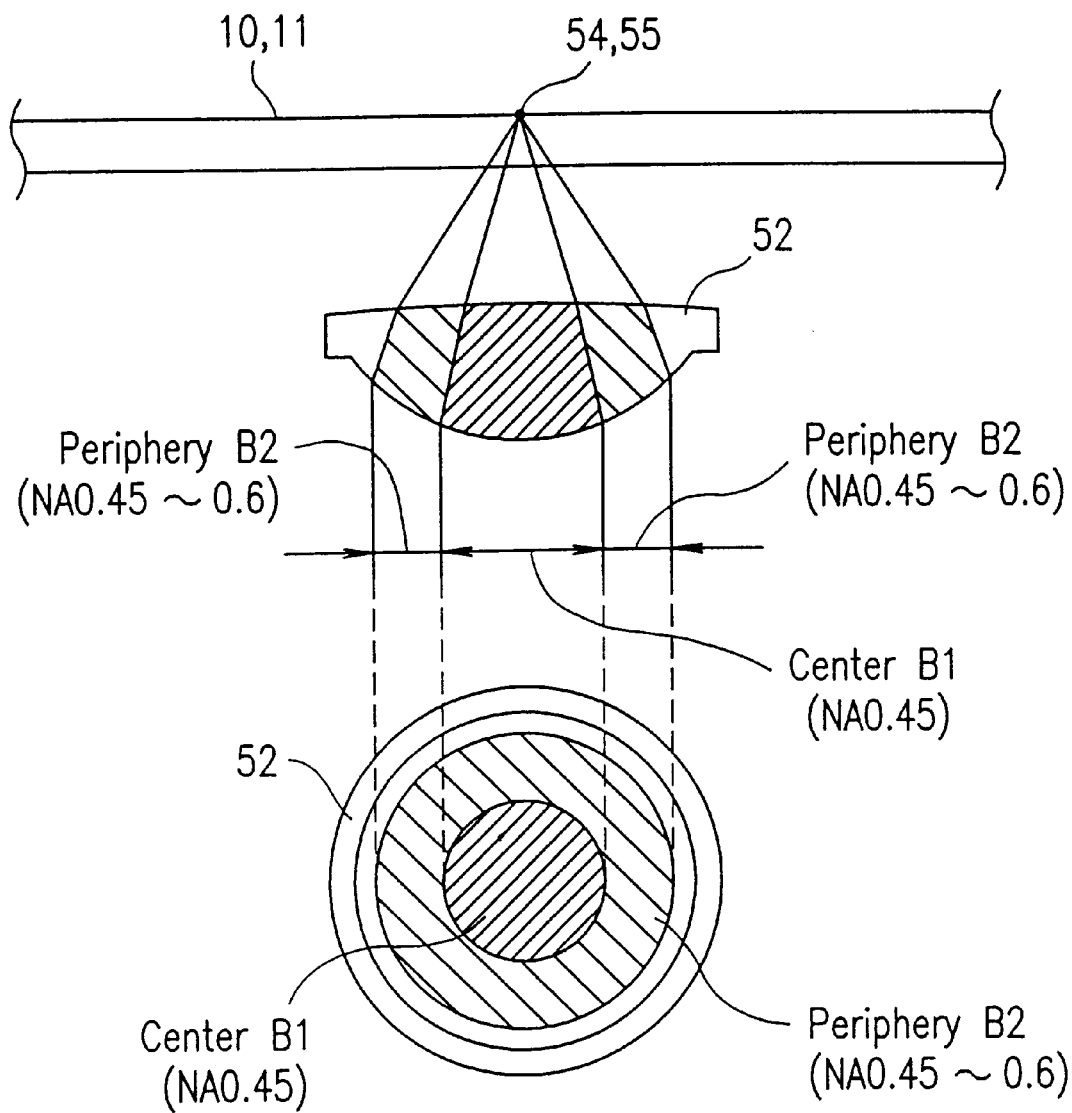
FIG. 9 shows the cross section and the upper surface of the objective lens in the optical head shown in FIG. 8.

The objective lens 52 is designed as shown in FIG. 9. Specifically, the center portion B1 having the numerical aperture of about 0.45 is designed such that the aberration of a light spot formed on the information recording surface of an optical disk becomes minimum when the base material thickness of the optical disk is about 0.9 mm. On the other hand, the periphery portion B2 having the numerical aperture in the range from about 0.45 to about 0.6 is designed such that the aberration of a light spot formed on the information recording surface of an optical disk becomes minimum when the base material thickness of the optical disk is about 0.6 mm. The surface of the objective lens 52 through which the luminous fluxes are transmitted is a continuous and smooth spherical surface.

Figure 10A:
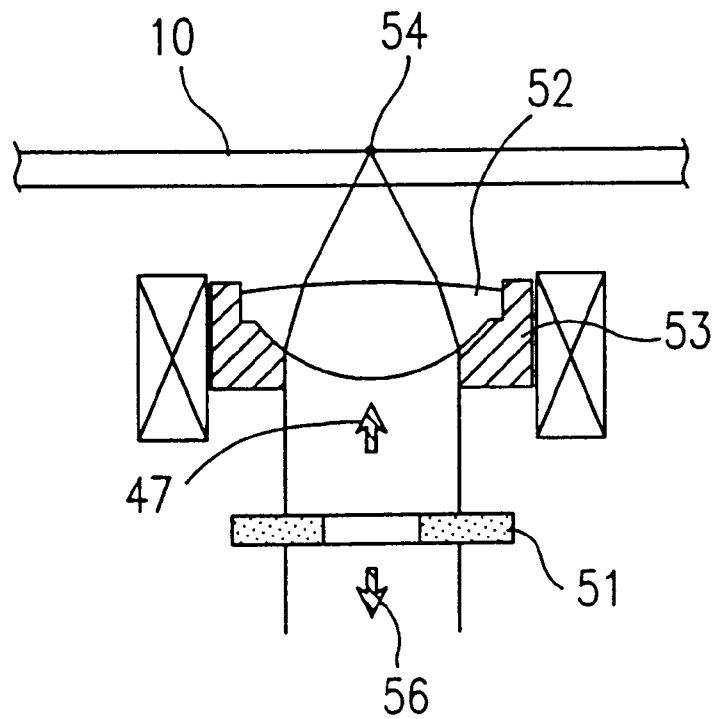
FIG. 10A is a view showing how information is recorded/reproduced by the optical head shown in FIG. 8 onto/from an optical disk having a base material thickness of about 0.6 mm.

FIG. 10A illustrates how information is recorded/reproduced onto/from the optical disk 10 having a base material thickness of about 0.6 mm. In this case, the luminous flux 47 having a wavelength of about 650 nm which has been emitted from the first semiconductor laser device 41 is transmitted through both the center portion B1 and the periphery portion B2 of the objective lens 52. Thus, the numerical aperture of the objective lens 52 is limited to about 0.6. The reflected luminous flux 56 reflected by the optical disk 10 is condensed again by the objective lens 52 and passed through the wavelength filter 51, the reflective mirror 50, the quarter-wave plate 49 and the optical path synthesizer/separator 43 so as to be incident onto the first polarization beam splitter 42. The reflected luminous flux 56 is transformed by the quarter-wave plate 49 into s-polarized light, which is reflected by the first polarization beam splitter 42, passed through a first cylindrical lens 58 and is received by a first photodetector 59. The first photodetector 59 photoelectrically converts the received reflected luminous flux 56 to form a reproduced signal, forms a focusing control signal in accordance with an astigmatism method, forms a tracking control signal in accordance with a phase difference method and a push-pull method, and then outputs these signals.

Figure 10B:
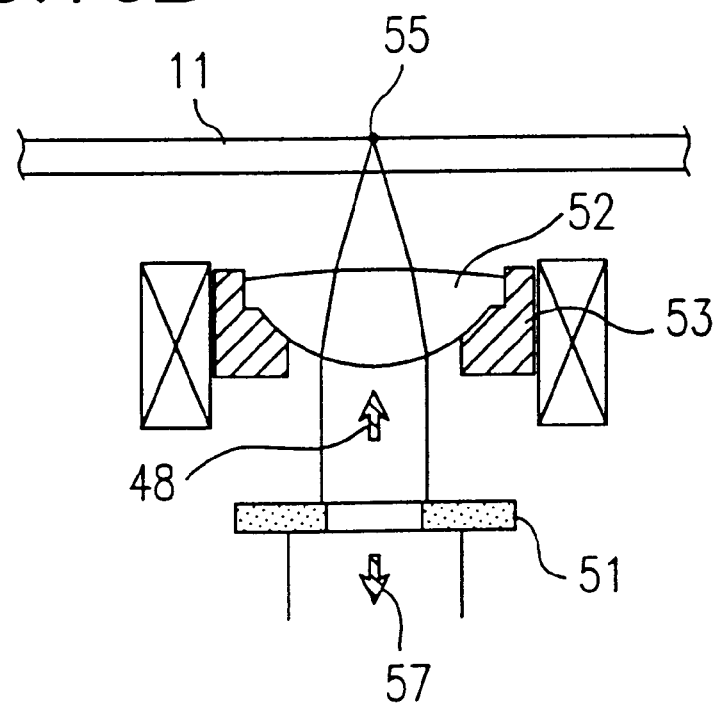
FIG. 10B is a view showing how information is recorded/reproduced by the optical head shown in FIG. 8 onto/from an optical disk having a base material thickness of about 1.2 mm.

FIG. 10B illustrates how information is recorded/reproduced onto/from the optical disk 11 having a base material thickness of about 1.2 mm. In this case, the luminous flux 48 having a wavelength of about 780 nm which has been emitted from the second semiconductor laser device 44 is transmitted only through the center portion B1 of the objective lens 52. Thus, the numerical aperture of the objective lens 52 is limited to about 0.45. The reflected luminous flux 57 reflected by the optical disk 11 is condensed again by the objective lens 52, passed through the wavelength filter 51, the reflective mirror 50 and the quarter-wave plate 49 and reflected by the optical path synthesizer/separator 43 so as to be incident onto the second polarization beam splitter 45. The reflected luminous flux 57 is transformed by the quarter-wave plate 49 into s-polarized light, which is reflected by the second polarization beam splitter 45, passed through a second cylindrical lens 60 and is received by a second photodetector 61. The second photodetector 61 photoelectrically converts the received reflected luminous flux 57 to form a reproduced signal, forms a focusing control signal in accordance with an astigmatism method, forms a tracking control signal in accordance with a phase difference method and a push-pull method, and then outputs these signals.

In this way, the aberration in the center portion B1 having a numerical aperture of about 0.45 is corrected such that the optimum base material thickness of the optical disk becomes about 0.9 mm. When information is reproduced from the optical disk 11 having a base material thickness of about 1.2 mm such as a CD, the numerical aperture of the objective lens 52 is limited to about 0.45. As a result, the aberration of the light spot can be set at a level comparable with a conventional objective lens, the spherical aberration of which has been wholly corrected such that the optimum base material thickness becomes about 0.6 mm. Furthermore, when information is reproduced from the optical disk 10 having a base material thickness of about 0.6 mm such as a DVD, the third-order spherical aberration of the objective lens is not increased even if the numerical aperture of the objective lens 52 is set at about 0.6.

In this third example, the aberration of the center portion B1 of the objective lens 52 is corrected such that the optimum base material thickness becomes about 0.9 mm. Alternatively, the aberration of the center portion B1 may be corrected such that the optimum base material thickness becomes 70% or more of the base material thickness of the optical disk 11, in the same way as in the first example illustrated in FIG. 1.

Moreover, in this example, the wavelength filter 51 is used as a means for limiting the aperture of the luminous flux 48. However, the same effects can also be attained even when the aperture of the reflected luminous flux 57 is limited by using a polarizing hologram, as described in the second example illustrated in FIGS. 4A and 4B.

EXAMPLE 4

Figure 11:
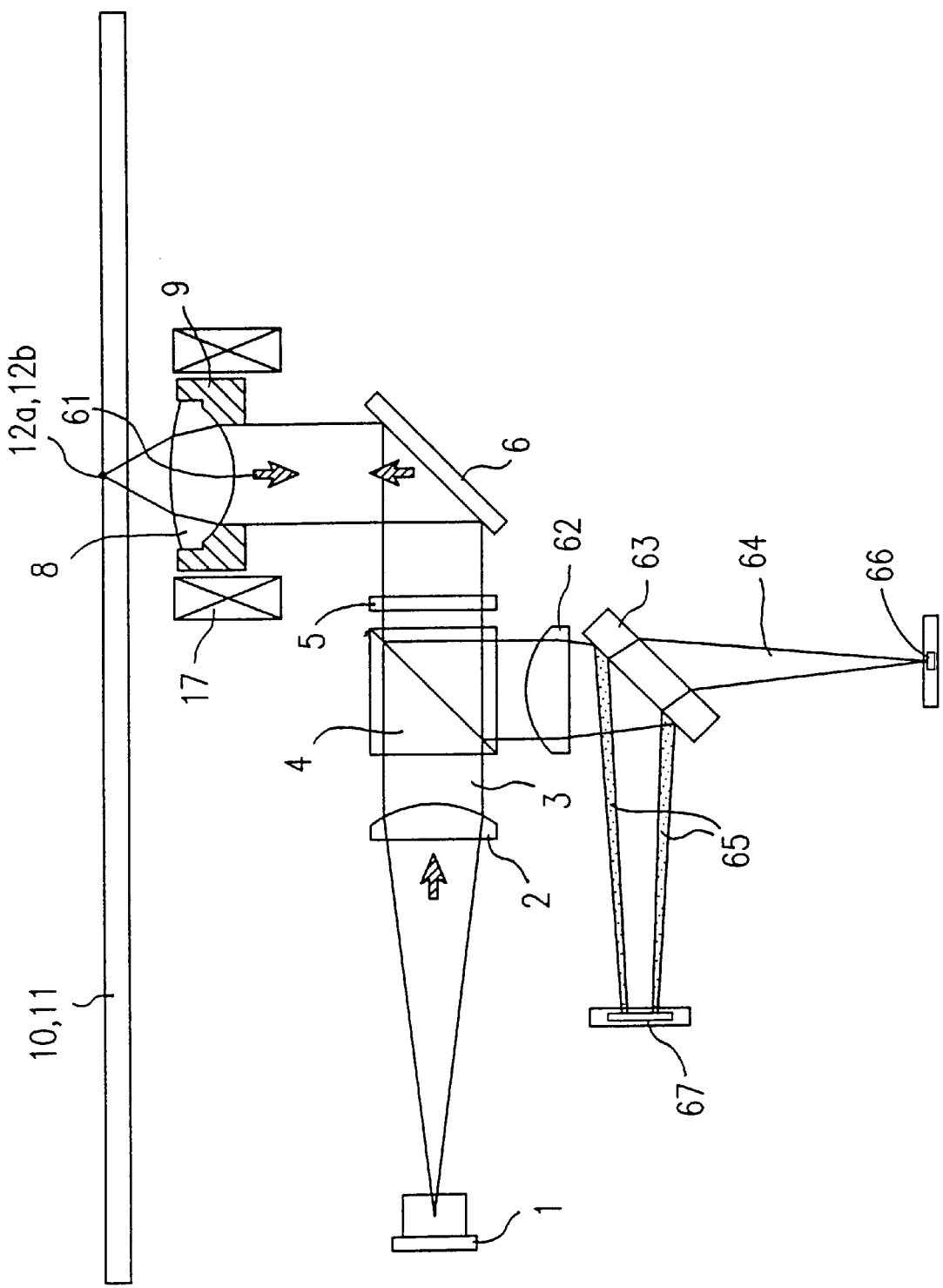
FIG. 11 is a block diagram showing the fourth example of the optical head of the present invention.

FIG. 11 illustrates the fourth example of the optical head of the present invention.

In FIG. 11, the radiated light having a wavelength of about 650 nm which has been emitted from a semiconductor laser device 1 is condensed by a condenser lens 2 to be transformed into a luminous flux 3 of substantially parallel light beams. The luminous flux 3 is p-polarized light, which is incident onto and transmitted through a polarization beam splitter 4. The luminous flux 3 which has been transmitted through the polarization beam splitter 4 is passed through and transformed by a quarter-wave plate 5 from linearly polarized light into substantially circularly polarized light, reflected by a reflective mirror 6, and then incident onto an objective lens 8. An objective lens holder 9 limits the numerical aperture of the objective lens 8 to about 0.6.

As described with reference to FIG. 2A, the numerical aperture (NA) of the center portion A1 of the objective lens 8 is about 0.37 and the NA of the periphery portion A2 thereof is about 0.6. The center portion A1 having the numerical aperture of about 0.37 is designed such that the aberration of a light spot formed on the information recording surface of an optical disk becomes minimum when the base material thickness of the optical disk is about 0.9 mm.

On the other hand, the periphery portion A2 having the numerical aperture of about 0.6 is designed such that the aberration of a light spot formed on the information recording surface of an optical disk becomes minimum when the base material thickness of the optical disk is about 0.6 mm.

The luminous flux 3 converged by the objective lens 8 forms a light spot 12a on the information recording surface of the optical disk 10 having a base material thickness of about 0.6 mm or forms a light spot 12b on the information recording surface of the optical disk 11 having a base material thickness of about 1.2 mm.

Next, the reflected luminous flux 61 reflected by the optical disk 10 or 11 is condensed again by the objective lens 8 and transformed by the quarter-wave plate 5 from substantially circularly polarized light into linearly polarized light which is orthogonal to the luminous flux 3. Thus, the reflected light 61 is incident as s-polarized light onto and reflected by the polarization beam splitter 4 and passed through a converging lens 62 to be incident onto a light separation mirror 63.

The light separation mirror 63 transmits the luminous flux transmitted through the center portion A1 of the objective lens 8 corresponding to a numerical aperture of about 0.37 and reflects the luminous flux transmitted through the periphery portion A2 of the objective lens 8. The reflected luminous flux 64 transmitted through the light separation mirror 63 has an astigmatism because the luminous flux 64 has been transmitted through the light separation mirror 63 having an inclination. The luminous flux 64 is received by a first photodetector 66. On the other hand, the reflected luminous flux 65 reflected by the light separation mirror 63 is received by a second photodetector 67.

The first photodetector 66 photoelectrically converts the received luminous flux 64 to form a reproduced signal, forms a focusing control signal in accordance with an astigmatism method, forms a tracking control signal in accordance with a phase difference method and a push-pull method, and then outputs these signals. On the other hand, the second photodetector 67 receives the reflected luminous flux 65 and forms and outputs a reproduced signal.

An objective lens driver 17 drives the objective lens 8 in the focusing direction and the tracking direction, thereby making the light spot 12a or 12b follow the tracks on the surface of the optical disk 10 or 11 onto/from which the information is recorded/reproduced.

In the above-described arrangement, in order to set the numerical aperture of the objective lens 8 at about 0.6 so that information is reproduced from the optical disk 10 having a base material thickness of about 0.6 mm, it is necessary to select all of the luminous flux which has been passed through the center portion A1 and the periphery portion A2 of the objective lens 8, i.e., the reflected luminous fluxes 64 and 65. For such a purpose, a sum of the signals reproduced by the first and the second photodetectors 66 and 67 is obtained, and the sum signal is used. On the other hand, in order to set the numerical aperture of the objective lens 8 at about 0.37 so that information is reproduced from the optical disk 11 having a base material thickness of about 1.2 mm, it is necessary to select a part of the luminous flux 61 which has been transmitted through the center portion A1 of the objective lens 8, i.e., only the reflected luminous flux 64. For such a purpose, only the signal reproduced by the first photodetector 66 is used.

In this way, instead of substantially limiting the aperture of the objective lens 8, the reflected luminous flux 61 which has been reflected by the optical disk 10 or 11 is separated by the light separation mirror 63, thereby forming the reflected luminous flux 64 which has passed through the center portion A1 having a numerical aperture of about 0.37 and the luminous flux 65 which has passed through the periphery portion A2 corresponding to a numerical aperture in the range from about 0.37 to about 0.6. These reflected luminous fluxes 64 and 65 are individually detected by the first and the second photodetectors 66 and 67 and then the reproduced signals of the first and the second photodetectors 66 and 67 are selectively used. In such a case, since no mechanical drive system is required for limiting the aperture of the objective lens, a downsized and highly reliable optical head can be formed.

In the foregoing examples, the present invention has been described as being applied to an objective lens and an optical head. However, it should be noted that an optical disk device (i.e., a device for recording/reproducing information onto/from a CD, a DVD and the like) including the objective lens and the optical head of the present invention also falls within the scope of the present invention.

As is apparent from the foregoing description, instead of providing an objective lens for a DVD which is optimized for an optical disk having a base material thickness of about 0.6 mm, the present invention provides an objective lens, the aberration of the center portion of which is corrected so as to form a light spot with a minimized aberration on an optical disk having a base material thickness in the range from about 0.84 mm to about 1.2 mm and the aberration of the periphery portion of which is corrected so as to form a light spot with a minimized aberration on an optical disk having a base material thickness of about 0.6 mm, thereby recording/reproducing information onto/from both a CD having a base material thickness of about 1.2 mm and a DVD having a base material thickness of about 0.6 mm.

Figure 12:
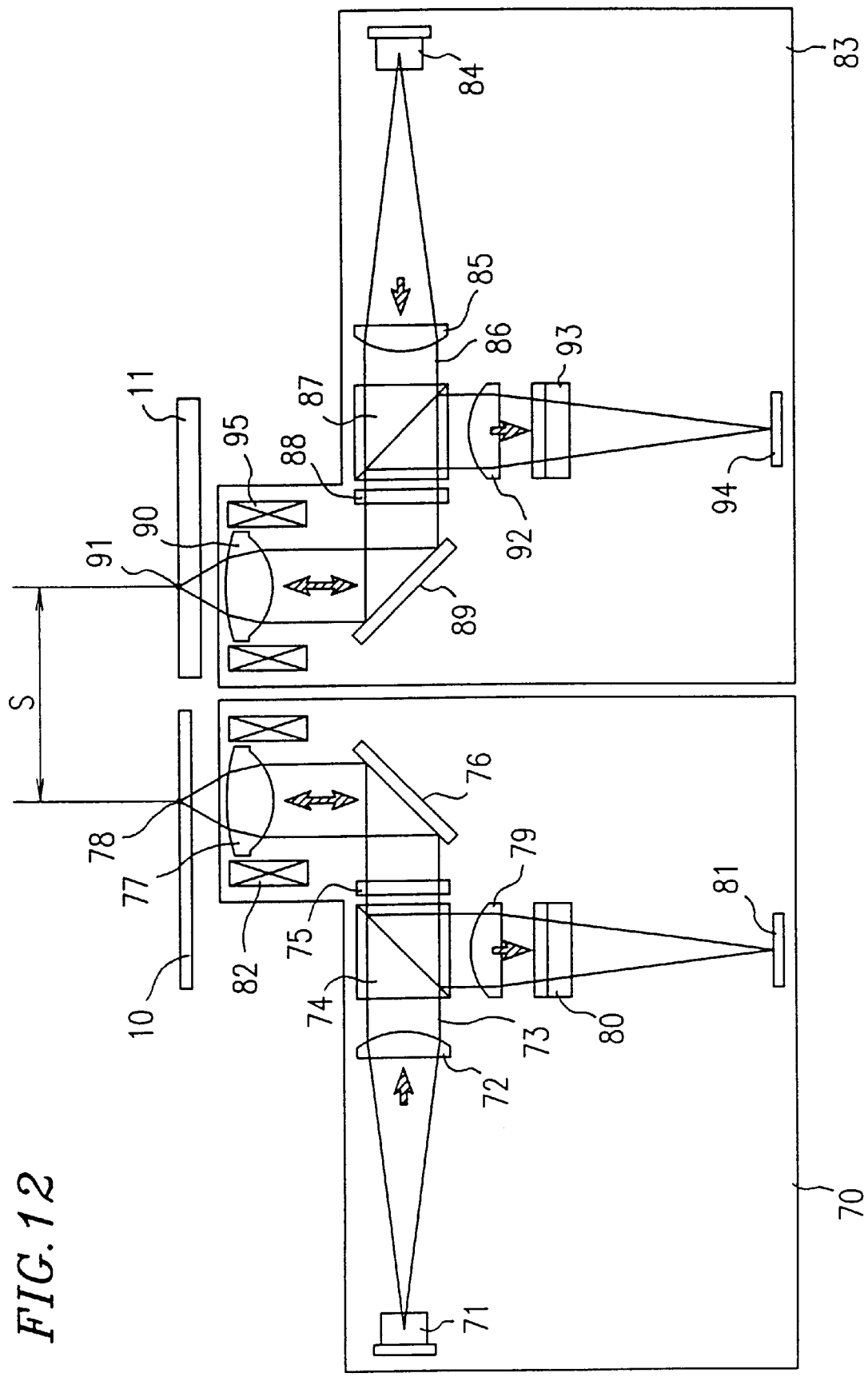
FIG. 12 is a block diagram showing a conventional optical head.
Figure 13:
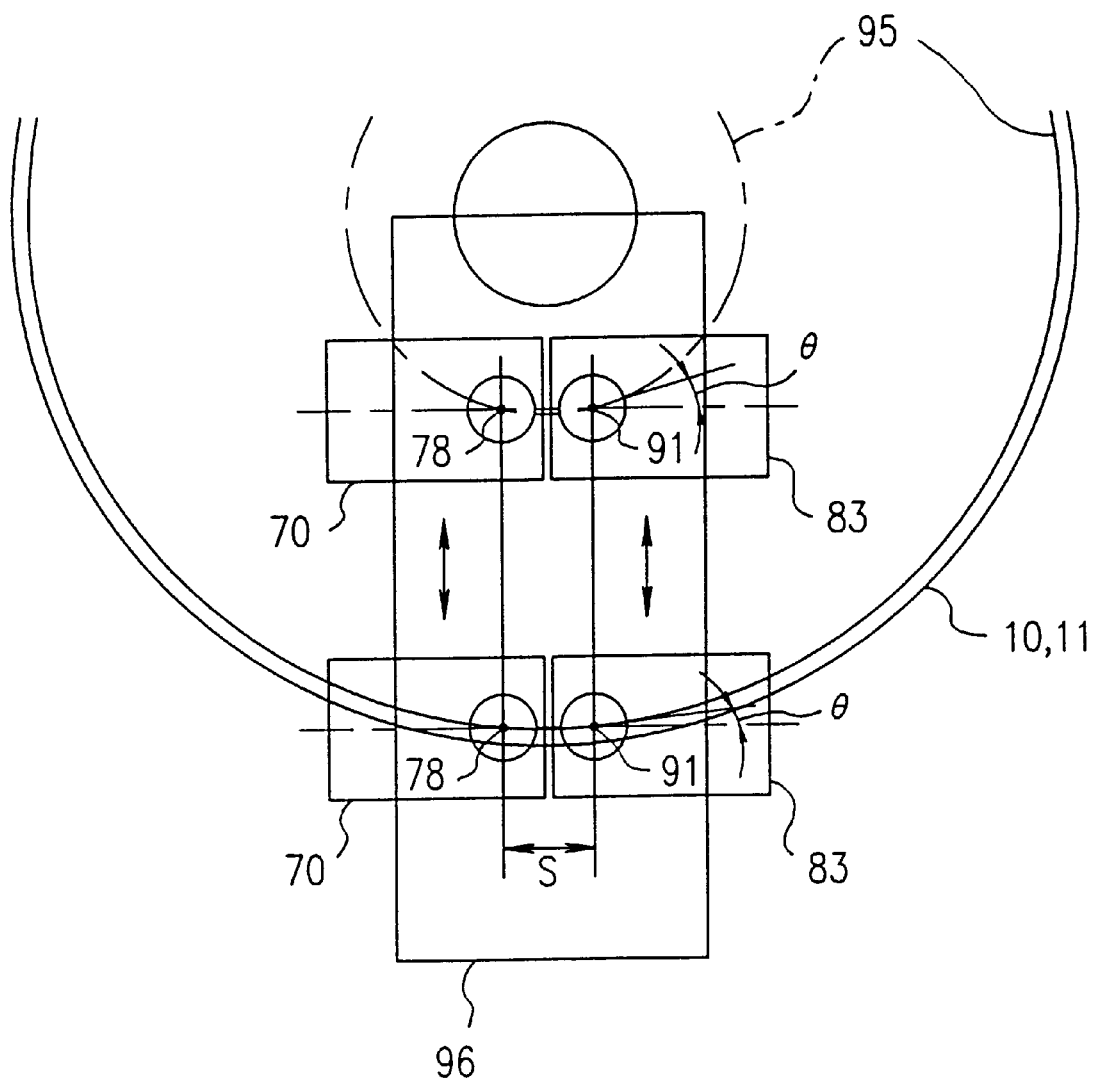
FIG. 13 is a plan view illustrating the operation of the optical head shown in FIG. 12.

In addition, in the case of recording/reproducing information onto/from a CD, the aperture of an objective lens is limited to the center portion thereof, thereby forming a light spot of the same size as that of a light spot formed by a conventional optical head exclusively used for a CD. Consequently, an optical head for a DVD can be provided with reduced costs and without using two optical systems and two objective lens drivers (or focusing drivers and tracking drivers) which are required in the conventional example shown in FIG. 12.

Furthermore, since the present invention can downsize an optical head without deteriorating the quality of a tracking signal as compared with a conventional optical head, information can be reproduced easily from an optical disk installed within a cartridge.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An objective lens comprising a center portion and a periphery portion surrounding the center portion, wherein the periphery portion is formed such that an aberration of a light spot formed by the convergence of a luminous flux which has been transmitted through the periphery portion and a first light transmissive flat plate becomes minimum, the center portion is formed such that an aberration of a light spot formed by convergence of a luminous flux which has been transmitted through the center portion and a second light transmissive flat plate, which is thicker than the first light transmissive flat plate, becomes minimum, and the periphery portion and the center portion are designed so that a reciprocal interference of the respective luminous fluxes which have passed through the periphery portion and the center portion is produced.

2. An optical disk device, comprising an optical head, for recording/reproducing information onto/from the information recording surfaces of a first and a second optical disks which have respectively different thicknesses and are used as the first and the second light transmissive flat plates of the optical head, the optical head including: a light source for emitting a luminous flux; an objective lens for converging the luminous flux onto either the information recording surface of a first light transmissive flat plate functioning as a recording medium or the information recording surface of a second light transmissive flat plate also functioning as a recording medium; separation means for separating the luminous flux, which has been reflected by or transmitted through either the information recording surface of the first light transmissive flat plate or the information recording surface of the second light transmissive flat plate, into a first luminous flux which has been transmitted through the periphery portion of the objective lens and a second luminous flux which has been transmitted through the center portion of the objective lens; and a photodetector for detecting the first and the second luminous fluxes, thereby outputting respective electric signals, wherein the objective lens of the optical head converges the luminous flux onto the information recording surfaces of the first and the second optical disks, the periphery portion and the center portion of the objective lens being designed so that a reciprocal interference of the respective luminous fluxes which have passed through the periphery portion and the center portion is produced, and the photodetector of the optical head detects the luminous flux, which has been reflected by or transmitted through the information recording surface of the first or the second disk, thereby outputting an electric signal.

3. An optical disk device, comprising an optical head, for recording/reproducing information onto/from the information recording surfaces of a first and a second optical disks which have respectively different thicknesses and are used as the first and the second light transmissive flat plates of the optical head, the optical head including a light source for emitting a luminous flux; an objective lens for converging the luminous flux onto either the information recording surface of a first light transmissive flat plate functioning as a recording medium or the information recording surface of a second light transmissive flat plate also functioning as a recording medium; and a photodetector for detecting the luminous flux, which has been reflected by or transmitted through the information recording surface of the first or the second light transmissive flat plate, thereby outputting an electric signal, the objective lens including a center portion and a periphery portion surrounding the center portion, an aberration of the periphery portion being corrected such that a light spot is formed by the convergence of the luminous flux which has been transmitted through the periphery portion and then transmitted through the first light transmissive flat plate, and an aberration of the center portion being corrected such that a light spot is formed by the convergence of the luminous flux which has been transmitted through the center portion and then transmitted through the second light transmissive flat plate which is thicker than the first light transmissive flat plate, wherein the objective lens of the optical head converges the luminous flux onto the information and recording surfaces of the first and the second optical disks, the periphery portion and the center portion of the objective lens being designed so that a reciprocal interference of the respective luminous fluxes which have passed through the periphery portion and the center portion is produced, and the photodetector of the optical head detects the luminous flux, which has been reflected by or transmitted through the information recording surface of the first or the second disk, thereby outputting an electric signal.

4. An optical disk device, comprising an optical head, for recording/reproducing information onto/from the information recording surfaces of a first and a second optical disks which have respectively different thicknesses and are used as the first and the second light transmissive flat plates of the optical head, the optical head including a first light source for emitting a first luminous flux; a second light source for emitting a second luminous flux having a wavelength different from a wavelength of the first luminous flux emitted by the first light source; an objective lens for converging the first luminous flux onto the information recording surface of a first light transmissive flat plate functioning as a recording medium and for converging the second luminous flux onto the information recording surface of a second light transmissive flat plate also functioning as a recording medium; and a photodetector for detecting the luminous flux, which has been reflected by or transmitted through the information recording surface of the first or the second light transmissive flat plate, thereby outputting an electric signal, the objective lens including a center portion and a periphery portion surrounding the center portion, an aberration of the periphery portion being corrected such that a light spot is formed by the convergence of the first luminous flux which has been transmitted through the periphery portion and then transmitted through the first light transmissive flat plate, and an aberration of the center portion being corrected such that a light spot is formed by the convergence of the second luminous flux which has been transmitted through the center portion and then transmitted through the second light transmissive flat plate which is thicker than the first light transmissive flat plate, wherein the objective lens of the optical head converges the luminous flux onto the information recording surfaces of the first and the second optical disks, the periphery portion and the center portion of the objective lens being designed so that a reciprocal interference of the respective luminous fluxes which have passed through the periphery portion and the center portion is produced, and the photodetector of the optical head detects the luminous flux, which has been reflected by or transmitted through the information recording surface of the first or the second disk, thereby outputting an electric signal.

5. An optical head comprising:

a light source for emitting a luminous flux;

an objective lens for converging the luminous flux onto either the information recording surface of a first light transmissive flat plate functioning as a recording medium or the information recording surface of a second light transmissive flat plate also functioning as a recording medium;

separation means for separating the luminous flux, which has been reflected by or transmitted through either the information recording surface of the first light transmissive flat plate or the information recording surface of the second light transmissive flat plate, into a first luminous flux which has been transmitted through the periphery portion of the objective lens and a second luminous flux which has been transmitted through the center portion of the objective lens; and a photodetector for detecting the first and the second luminous fluxes, thereby outputting respective electric signals, wherein the periphery portion and the center portion of the objective lens are designed so that a reciprocal interference of the respective luminous fluxes which have passed through the periphery portion and the center portion is produced.

6. An optical head comprising:

a first light source for emitting a first luminous flux;

a second light source for emitting a second luminous flux having a wavelength different from a wavelength of the first luminous flux emitted by the first light source;

an objective lens for converging the first luminous flux onto the information recording surface of a first light transmissive flat plate functioning as a recording medium and for converging the second luminous flux onto the information recording surface of a second light transmissive flat plate also functioning as a recording medium; and a photodetector for detecting the luminous flux, which has been reflected by or transmitted through the information recording surface of the first or the second light transmissive flat plate, thereby outputting an electric signal, wherein the objective lens includes a center portion and periphery portion surrounding the center portion, an aberration of the periphery portion is corrected such that a light spot is formed by the convergence of the first luminous flux which has been transmitted through the periphery portion and then transmitted through the first light transmissive flat plate, an aberration of the center portion is corrected such that a light spot is formed by the convergence of the second luminous flux which has been transmitted through the center portion and then transmitted through the second light transmissive flat plate which is thicker than the first light transmissive flat plate, and the periphery portion and the center portion of the objective lens are designed so that a reciprocal interference of the respective luminous fluxes which have passed through the periphery portion and the center portion is produced.

7. An optical head according to claim 6, wherein the first and the second light transmissive flat plates have a thickness t1 and a thickness t2, respectively, the aberration of the periphery portion is corrected such that a light spot is formed by the convergence of the first luminous flux which has been transmitted through the periphery portion of the objective lens and then transmitted through the first light transmissive flat plate having the thickness t1, and the aberration of the center portion is corrected such that a light spot is formed by the convergence of the second luminous flux which has been transmitted through the center portion of the objective lens and then transmitted through a light transmissive flat plate having a thickness in the range from about (t2×0.7) to t2.

8. An optical head according to claim 7, wherein the thickness t2 of the second light transmissive flat plate is set at a thickness approximately twice as large as the thickness t1 of the first light transmissive flat plate.

9. An optical head according to claim 6, wherein, assuming the thickness t1 of the first light transmissive flat plate to be about 0.6 mm and the thickness t2 of the second light transmissive flat plate to be about 1.2 mm, the aberration of the periphery portion is corrected such that a light spot is formed by the convergence of the first luminous flux which has been transmitted through the periphery portion of the objective lens and then transmitted through the first light transmissive flat plate having the thickness of about 0.6 mm, and the aberration of the center portion is corrected such that a light spot is formed by the convergence of the second luminous flux which has been transmitted through the center portion of the objective lens and then transmitted through a light transmissive flat plate having a thickness in the range from about 0.84 mm to about 1.2 mm.

10. An optical head according to claim 6, further comprising aperture control means for limiting the aperture of the objective lens, wherein the aperture of the objective lens is limited by the aperture control means when the second luminous flux emitted from the second light source is converged onto the information recording surface of the second light transmissive flat plate.

11. An objective lens according to claim 10, wherein the aperture control means is a wavelength filter for transmitting the second luminous flux emitted from the second light source and blocking the first luminous flux emitted from the first light source.

12. An optical head according to claim 6, further comprising separation means for separating the luminous flux, which has been reflected by or transmitted through either the information recording surface of the first light transmissive flat plate or the information recording surface of the second light transmissive flat plate, into the first luminous flux which has been transmitted through at least the periphery portion of the objective lens and the second luminous flux which has been transmitted through the center portion of the objective lens, wherein the photodetector detects the first and the second luminous fluxes, thereby outputting respective electric signals, and wherein the electric signal of the photodetector corresponding to the first luminous flux is selected when the first luminous flux is converged onto the information recording surface of the first light transmissive flat plate, and wherein the electric signal of the photodetector corresponding to the second luminous flux is selected when the second luminous flux is converged onto the information recording surface of the second light transmissive flat plate.

13. An optical head according to claim 12, wherein the separation means is a polarizing hologram.

14. An optical head according to claim 6, wherein, assuming the wavelength of the first luminous flux emitted from the first light source is in the range from about 600 nm to about 700 nm and the wavelength of the second luminous flux emitted from the second light source is in the range from about 750 nm to about 860 nm, the numerical aperture of the center portion of the objective lens is set to be substantially equal to about 0.45 and the numerical aperture of the periphery portion of the objective lens is set to be substantially equal to about 0.6.

* * * * *